(12) United States Patent  
Maguire

(10) Patent No.: US 8,753,432 B2
(45) Date of Patent: Jun. 17, 2014

(54) TILTABLE VACUUM LOADER AND RECEIVER WITH BLOW-BACK

(76) Inventor: Stephen B. Maguire, West Chester, PA (US)

(\*) Notice: Subject to any disclaimer, the term of this patent is extended or adjusted under 35 U.S.C. 154(b) by 69 days.

(21) Appl. No.: 13/310,978

(22) Filed: Dec. 5, 2011

(65) Prior Publication Data

US 2012/0160866 A1 Jun. 28, 2012

Related U.S. Application Data

(63) Continuation-in-part of application No. 12/201,562, filed on Aug. 29, 2008, now Pat. No. 8,070,844.

(60) Provisional application No. 60/967,065, filed on Aug. 31, 2007.

(51) Int. Cl.
*B01D 46/04* (2006.01)

(52) U.S. Cl.
USPC ............. 95/280; 55/283; 55/302; 55/385.1; 406/171

(58) Field of Classification Search
USPC ............ 55/324, 320, 337, 341.5, 345, 350.1, 55/434, 440, 443, 447, 452, 453, 455, 456, 55/459.1, 460, 462, 467, DIG. 3; 96/380, 96/382, 384; 406/18, 22, 34, 36, 163, 168; 137/177, 628; 251/29
See application file for complete search history.

(56) References Cited

U.S. PATENT DOCUMENTS

| | | |
|---|---|---|
| 2,161,190 A | 6/1939 | Paull |
| 3,111,115 A | 11/1963 | Best |
| 3,115,276 A | 12/1963 | Johanningmeier |
| 3,209,898 A | 10/1965 | Beebe et al. |
| 3,348,848 A | 10/1967 | Lucking et al. |
| 3,470,994 A | 10/1969 | Schnell et al. |
| 3,570,542 A | 3/1971 | Otto et al. |
| 3,959,636 A | 5/1976 | Johnson et al. |
| 3,985,262 A | 10/1976 | Nauta |
| 4,026,442 A | 5/1977 | Orton |
| 4,108,334 A | 8/1978 | Moller |
| 4,148,100 A | 4/1979 | Moller |
| 4,219,136 A | 8/1980 | Williams et al. |
| 4,227,893 A * | 10/1980 | Shaddock ................. 95/268 |

(Continued)

FOREIGN PATENT DOCUMENTS

| | | |
|---|---|---|
| DE | 3541532 A1 | 5/1986 |
| DE | 3923241 A1 | 1/1991 |

(Continued)

OTHER PUBLICATIONS

Instructions for the Model GVL Glass-Vu Loader, Model: GVL-10, Maguire Products Inc., Oct. 6, 2009 (15 pages).

(Continued)

*Primary Examiner* — Duane Smith
*Assistant Examiner* — Minh-Chau Pham
(74) *Attorney, Agent, or Firm* — Charles N. Quinn; Fox Rothschild LLP

(57) ABSTRACT

A vacuum loader for providing granular resin material to resin material processing equipment has a loader housing, a vacuum motor, a dust filter, an air blast generator, a dump flap, and a pivoting manually releasable latch for retaining the lateral web and the loader from tilting rotation of the loader about the shaft and supporting the loader when placed in a tilted orientation; the latch being weighted to pivotally return to a web-retaining position when released by an operator.

33 Claims, 19 Drawing Sheets

(56) References Cited

U.S. PATENT DOCUMENTS

| | | | |
|---|---|---|---|
| 4,294,020 A * | 10/1981 | Evans | 34/168 |
| 4,354,622 A | 10/1982 | Wood | |
| 4,402,436 A | 9/1983 | Hellgren | |
| 4,454,943 A | 6/1984 | Moller | |
| 4,475,672 A | 10/1984 | Whitehead | |
| 4,498,783 A | 2/1985 | Rudolph | |
| 4,525,071 A | 6/1985 | Horowitz et al. | |
| 4,564,374 A | 1/1986 | Hofmann | |
| 4,581,704 A | 4/1986 | Mitsukawa | |
| 4,705,083 A | 11/1987 | Rossetti | |
| 4,756,348 A | 7/1988 | Moller | |
| 4,793,711 A | 12/1988 | Ohlson | |
| 4,830,508 A | 5/1989 | Higuchi et al. | |
| 4,848,534 A | 7/1989 | Sandwall | |
| 4,850,703 A | 7/1989 | Hanaoka et al. | |
| 5,110,521 A | 5/1992 | Moller | |
| 5,116,547 A | 5/1992 | Tsukahara et al. | |
| 5,132,897 A | 7/1992 | Allenberg | |
| 5,143,166 A | 9/1992 | Hough | |
| 5,148,943 A | 9/1992 | Moller | |
| 5,172,489 A | 12/1992 | Moller | |
| 5,178,652 A | 1/1993 | Huttlin | |
| 5,180,407 A * | 1/1993 | DeMarco | 55/302 |
| 5,225,210 A | 7/1993 | Shimoda | |
| 5,252,008 A | 10/1993 | May, III et al. | |
| 5,261,743 A | 11/1993 | Moller | |
| 5,285,930 A | 2/1994 | Nielsen | |
| 5,340,949 A | 8/1994 | Fujimura et al. | |
| 5,341,961 A | 8/1994 | Hausam | |
| 5,423,455 A | 6/1995 | Ricciardi et al. | |
| 5,651,401 A | 7/1997 | Cados | |
| 5,767,453 A | 6/1998 | Wakou et al. | |
| 5,767,455 A | 6/1998 | Mosher | |
| 5,780,779 A | 7/1998 | Kitamura et al. | |
| 5,791,830 A * | 8/1998 | Fort et al. | 406/151 |
| 5,843,513 A | 12/1998 | Wilke et al. | |
| 5,884,654 A | 3/1999 | Oike | |
| 6,089,794 A * | 7/2000 | Maguire | 406/18 |
| 6,152,656 A | 11/2000 | Curtis et al. | |
| 6,379,086 B1 | 4/2002 | Goth | |
| 6,413,020 B1 | 7/2002 | Davison | |
| 6,638,344 B2 * | 10/2003 | Horton et al. | 95/280 |
| 6,936,085 B2 * | 8/2005 | DeMarco | 55/324 |
| 7,066,689 B2 * | 6/2006 | Maguire | 406/18 |
| 7,459,003 B2 | 12/2008 | Crockett et al. | |
| 7,550,023 B2 | 6/2009 | Schuster et al. | |
| 8,070,844 B2 * | 12/2011 | Maguire | 55/283 |
| 2005/0120881 A1 | 6/2005 | Sporre et al. | |
| 2006/0086070 A1 | 4/2006 | Althouse et al. | |
| 2006/0093444 A1 * | 5/2006 | McConnell | 406/197 |
| 2006/0147278 A1 * | 7/2006 | Boring et al. | 406/168 |
| 2007/0039290 A1 | 2/2007 | Lee | |

FOREIGN PATENT DOCUMENTS

| | | |
|---|---|---|
| DE | 4323295 C1 | 2/1995 |
| EP | 0507689 A2 | 10/1982 |
| EP | 0318170 A2 | 5/1989 |
| EP | 0587085 A2 | 3/1994 |
| EP | 0743149 A1 | 11/1996 |
| FR | 2109840 A5 | 5/1972 |
| FR | 2235775 A1 | 7/1974 |
| FR | 2517087 A1 | 5/1983 |
| GB | 2081687 A | 2/1982 |
| JP | 01-235604 | 9/1989 |
| JP | 04-201522 | 7/1992 |
| JP | 06-114834 | 4/1994 |

OTHER PUBLICATIONS

Model MLS Clear Vu® Eight Component Vacuum Loading System, Installation—Operation—Maintenance, Maguire Products, Inc., Jul. 25, 2010 (30 pages).
MPL Series—ML Series® Venturi Loaders Instruction Manual, Maguire Products, Inc., Aug. 9, 2010 (23 pages).
Brochure entitled "Plastic Molders and Extruders: published by Maguire Products, Inc., 1995".
Five page brochure entitled "Blending power: GXB Blender The Better Alternative" of Mould-Tek, circa 1998.
Two page brochure entitled "Mould-Tek Bulk Handling Systems" published by Mould-Tek Industries, Inc. in Canada, circa 1993.
Advertisement entitled "Machinery and Systems for Extrusion is Our Only Business" by Process Control Corporation, circa 1993.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circa 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Advertisement "Introducing our 400 VME-II Gravimetric Blender" by HydReclaim Corporation, circa 1993.
Four page brochure entitled "Gravimix Better Quality through Research", circa 1993.
Four page brochure entitled "Conomix Plus Volumetric Blender" dated Aug. 1993.
Four page brochure entitled "Conair Franklin Autocolor Y Mezclador" dated Mar. 1995.
Two-sided flyer entitled "GB 140 Series Compact Auto Weigh Blender" published by Conair Franklin in the United States, Jun. 1994.
Six page brochure entitled "Piovan Gravimetric Blenders MDW" published by Piovan Sri, Oct. 1993, Venezia, Italy.
Four page brochure entitled "When you Weigh it All Up . . . " published by Ferlin Trading, Holland, circa 1993.
Thirty-two page color catalog entitled "Maguire Color Blending Equipment" published by Maguire Products, Inc., 1993.
Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Two-sided flyer entitled "Gravimix, The New Gravimetric Blending Generation" published by Ferlin, De demsvaard, Holland, circa 1993.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
Four page two-sided color brochure entitled AEC Whitlock: Vacuum Conveying Systems: VacTrac™ Series of AEC, Inc., 1991.
One page color brochure entitled "AEC Engineering What's Next: One Touch. Two Wires. Total Control." of AEC, Inc., 2000.
One page two-sided color brochure entitled Vactrac™ Series Vacuum Conveying Controls of AEC, Inc., 2000.
One page two-sided color brochure entitled "Vacuum Conveying Systems: VacTrac™ Series 8-Station SMART™ Control" of AEC, Inc., 1997.
Two page two-sided color brochure entitled "Model GXB-2202 Exac-U-Batch Gravimetric Scale Blender: Accurate weigh scale blending under precise computer control" of Mould-tek, 2000.
Forty-four page two-sided brochure including cover and back pages entitled "Maguire: Auxiliary equipment for the plastics industry" of Maguire Products, Inc., Oct. 2000.
Two page two-sided color brochure entitled "WDMR Series Compact Dryers" of AEC Whitlock, 1998.

(56) References Cited

OTHER PUBLICATIONS

Two page two-sided color reprint entitled "10 most frequently asked questions about Dryers" by Joseph Dziediz, AEC/Whitlock, from Plastics Technology, Jan. 1998.

Two page two-sided color brochure entitled "Drying Systems: WD Series High Capacity Dehumidifying Dryers" of AEC Whitlock, 1997.

Three page two-sided color brochure entitled "Portable Drying and Conveying Systems: Nomad™ Series Portable Dryers", AEC Whitlock, 1998.

Two page two-sided color brochure entitled "Drying Systems: WD Series Dehumidifying Dryers" of AEC Whitlock, 1997.

Five page two-sided color brochure entitled "AEC Auxiliaries As Primary", AEC, Inc., 1999.

19 page document entitled "Model MLS—Clear Vu Eight Component Vacuum Loading System: Operation Manual" of Maguire Products, Inc. dated May 4, 1999.

One page two-sided color brochure entitled "Maguire Clear-Vu™ Loading System" of Maguire Products, Inc., 1999.

Eight page two-sided color brochure entitled "Novatec Inc. Material Conveying Solutions for the Plastics Industry", 1999.

Two page two-sided color brochure entitled Maguire Model MPM Pre-Mixers of Maguire Products, Inc., Apr. 1997.

One page, two-sided color brochure entitled "Bulk handling power: the manufacturer of the world's most advanced blender gives you the same performance in bulk handling systems" of Mould-Tek, dated Apr. 1999.

\* cited by examiner

TILTABLE VACUUM LOADER AND RECEIVER WITH BLOW-BACK

CROSS REFERENCE TO RELATED PATENT APPLICATIONS

This patent application is a 35 USC 120 continuation-in-part of U.S. patent application Ser. No. 12/201,562, filed 29 Aug. 2008 and published as US2009/0126564 A1 on 21 May 2009, now U.S. Pat. No. 8,070,844 B2 which claims the priority of U.S. provisional patent application Ser. No. 60/967,065 filed 31 Aug. 2007.

This application claims the priority of U.S. Ser. No. 12/201,562 under 35 USC 120 and of U.S. Ser. No. 60/967,065 under 35 USC 119 and 120.

The disclosures of U.S. Ser. No. 60/967,065 and U.S. Ser. No. 12/201,562 are hereby incorporated by reference.

BACKGROUND

1. Field of Invention

This invention relates to apparatus and methods for applying a blast of compressed air to an air filter of a granular plastic resin vacuum loader or receiver into which resin conveyance is powered by vacuum.

The invention further relates to apparatus and methods to dislodge resin pellets that may have stuck at the bottom of the loader or receiver, thereby preventing tight closure of a discharge flap and interfering with maintenance of the vacuum used to draw the granular plastic resin pellets into the loader or receiver.

The invention still further relates to loaders, for supplying granular plastic resin pellets to gravimetric blenders and other devices, which operate in a vertical orientation. Operation in the vertical orientation assures minimal and symmetrical stresses on the vacuum motor due to the vertical orientation of the vacuum motor shaft.

2. Description of the Prior Art

In plastics molding and extrusion facilities, it is typical for the granular plastic resin, which is to be molded or extruded in the facility, to be initially shipped to the facility in the form of pellets in large, heavy containers. These containers are delivered to the facility and stored there until the granular plastic resin pellets are required for use in the molding or extrusion process.

When the pellets of granular plastic resin material are needed, pellets of granular plastic resin material are removed from the storage container from time to time and conveyed, typically by a vacuum system, to where the pellets of granular plastic resin material are needed for molding or extrusion.

Plastic molding and extrusion facilities typically have vacuum lines running throughout the facility, in which vacuum of relatively low level, namely close to but below atmospheric pressure, is maintained. This vacuum is used to convey pellets of granular plastic resin material about the facility, thereby to deliver the pellets of granular plastic resin material to the loaders or receivers, which in turn function as temporary storage receptacles. The loaders or receivers typically provide the pellets of granular plastic resin material to gravimetric blenders or other devices. The gravimetric blenders blend the pellets of granular plastic resin material with additives, recycled resin pellets, and other ingredients to create a granular plastic resin material mix that is suitable for molding or extrusion.

A "receiver" for the pellets of granular plastic resin material includes a tube coupled to a vacuum source. Using vacuum, the tube conveys the pellets of granular plastic resin material into the receiver, where those pellets reside until the gravimetric blender or other device below the receiver needs additional pellets to prepare the blend of resin material for molding or extrusion. When a signal comes from the gravimetric blender, which signal may be provided by a level sensor within a storage bin of a gravimetric blender, a microprocessor associated with the receiver opens the bottom of the receiver. The pellets of granular resin plastic material then flow downwardly out of the receiver into the hopper of the gravimetric blender or other device. The pellets of granular plastic resin material are conveyed into the receiver by vacuum maintained within one of the tubes connected to the receiver. In this arrangement, the vacuum is drawn by a vacuum pump located elsewhere in the plastic molding or extrusion facility.

The receiver is typically equipped with a dust filter located between the space in the receiver in which the resin pellets reside and the suction intake for the vacuum line that pulls the vacuum from the receiver. The filter keeps dust and other particulate matter, traveling with the pellets of granular plastic material, from entering the suction intake through which the vacuum is drawn. Otherwise the dust would be drawn through the vacuum system, eventually reaching and entering the vacuum motor or pump located downstream, and likely fouling the vacuum motor or pump, thereby disrupting operation of the vacuum system and necessitating shutdown of the molding or extrusion operation.

A more common approach is to use a "loader", which has a motor for drawing vacuum as a part of the loader. Prior art vacuum loaders are disclosed in U.S. Pat. Nos. 6,089,794 and 7,066,689, both issued in the name of Stephen B. Maguire, the inventor of record in the instant patent application. The loader is connected to a tube through which pellets of granular plastic material are conveyed typically by vacuum, but sometimes by air, throughout the plastic molding or extrusion facility. When the loader is actuated, the vacuum motor draws pellets of granular plastic resin material into a housing portion of the loader. The loader is equipped with a filter located between the inlet opening, through which the pellets of granular plastic resin material enter the loader, and a suction intake or opening leading to the vacuum motor. As with a receiver as described above, the filter keeps dust and other particulate matter, traveling with the pellets of granular plastic resin material, from entering the suction intake of the vacuum motor, fouling the motor and thereby interrupting operation.

Such dust filters are commonly used in both loaders and receivers and are positioned between the intake aperture, by which the pellets of granular plastic resin material enter the loader or receiver, and the suction intake for the vacuum motor (in the case of a loader) or the suction draw orifice (in the case of a receiver). During operation, air is typically drawn upwardly under vacuum in a vacuum loader to the suction intake for the vacuum motor. In a receiver, during operation, air is typically drawn under vacuum to the suction outlet of the receiver. In either case, the air drawn under vacuum passes through the filter, which removes dust particles and other contaminants from the air. As operation continues, dust and contaminants tend to clog the filter, reducing the amount of air that may be drawn by vacuum through the filter, thereby compromising operation of the vacuum motor in the case of a loader, or compromising the operation of the plant vacuum system in the case of a receiver.

To reduce this problem, it is known to force air through the filter, in a direction opposite that in which the vacuum is drawn when the loader or receiver is in operation. The air to be forced through the filter is provided by an air accumulator in conjunction with a typically solenoid-operated diaphragm valve. Typically, a reservoir is provided for accumulating some volume of air, with the reservoir being proximate the air filter. In a typical prior art loader or receiver, a diaphragm valve is typically positioned between the reservoir and the filter. When the valve is in a closed position, air, furnished from an air system that typically runs throughout the molding or extrusion facility and supplies compressed air at various points in the facility, for various purposes in the course of the molding or extrusion operation, fills the reservoir.

When the valve opens, air within the reservoir, being exposed to the vacuum environment within the loader or receiver, flows out of the reservoir, filling the volume between the filter and the vacuum intake, with some of the air passing through the filter. The reservoir supplies more air to the volume bounded in part by the filter and at a somewhat higher pressure than air drawn through the filter during normal operation of the loader or the receiver. This reverse flow of air, relative to the normal direction of air flow through the filter as drawn by the vacuum source, serves to clear the filter to some degree by removing some of the dust and entrained contaminants from the filter.

The solenoid operated diaphragm valve and air reservoir arrangements of the prior art provide improved operation over loaders and receivers that do not have such arrangements. However, the diaphragm valve/reservoir approach has limitations. Typically, the air from the reservoir flows rather gently and acts on only a relatively small area of the filter, because flow of air into the portion of the loader or reservoir between the filter and the vacuum source is necessarily limited by the size and cross-sectional area of the valve, through which the air must pass.

While providing a larger valve is one possible solution to the problem, significant cost increases and material handling problems are associated with larger valves, such that this is not a viable approach. Additionally the diaphragm valve approach often requires pilot valves, introducing more moving parts into the system, with a necessarily greater risk of failure. Moreover the risk of rupture of the diaphragm is always present.

Another approach to the problem is to provide multiple outlets using multiple solenoid actuated diaphragm valves for the high pressure air directed towards the filter. This again provides a costly and largely ineffective solution to this ongoing problem plaguing the plastic fabrication industry.

Both loaders and receivers are used by the plastic industry to convey plastic resin pellets to process machines. On such loaders and receives, it is common to have a hinged flap at the bottom to allow discharge of the resin material, as well as to seal the bottom during loading to achieve the required vacuum to transport the resin material into the loader or receiver. In such loaders or receivers, a dump flap is sometimes also used as a level sensor to signal when the hopper requires an additional load of material. The dump flap is weighted in such a way so that it wants to close. Material that piles high in the hopper below the loader will block the dump flap from closing. When the pile drops, the dump flap swings closed and operates a device to signal the loader to load additional resinous material.

A problem is that static electricity will cause resin pellets to cling to the dump flap. When the dump flap closes, it is common for pellets to block the flap from closing completely. The result is an air leak, poor vacuum being drawn and little or no loading occurring during that load cycle due to the lack of sufficient vacuum to draw material into the loader or receiver.

One solution that has been used heretofore is addition of a soft rubber gasket to the dump flap, allowing pellets to sink into the rubber and still achieve a good seal at the dump flap. This approach does not always work and the gaskets degrade over time. These pellet adhesion problems can account for loss of up to fifty percent (50%) of the operating time of the loader or receiver.

Tilted loaders are known and used because their tilted orientation facilitates cleaning, but they are less than satisfactory in that they do not empty consistently, especially if the material being loaded is not an easily flowing material.

SUMMARY OF THE INVENTION

In one of its aspects this invention provides apparatus for delivering an air blast where the apparatus includes a housing having a first aperture therein via which the air blast is delivered, an optional reservoir aperture leading to an optional air reservoir, and a second aperture via which air is initially supplied to the air blast apparatus. The apparatus includes a closure member residing slideably within the housing and being moveable between a position at which the closure member preferably contactingly closes the first aperture and a position removed therefrom. The apparatus yet further includes a seal between the closure member and the housing, with the seal permitting incoming air flow from the second aperture between the housing and the closure member towards the first aperture, but blocking air flow between the housing and the closure member in a direction away from the first aperture back towards the second aperture.

When pressurized air is furnished to the housing via the second aperture, air preferably flows into the housing between the housing and the closure member. The closure member is urged by the pressurized air against the first aperture and closes the first aperture, with pressurized air then flowing through the optional reservoir aperture to fill the optional reservoir. The pressurized air is preferably blocked by the seal from flowing between the housing and the closure member back towards the air supply. When pressurized air is no longer furnished from the air supply and air pressure therefrom is relieved, the closure member moves away from the first aperture due to force exerted thereon by pressurized air in the housing, thereby opening the first aperture and allowing pressurized air in the housing and the optional reservoir to escape via the first aperture as an air blast, directed toward and against the air filter, in a direction opposite that of the draw of vacuum through the filter.

In yet another one of its aspects this invention embraces a vacuum loader for providing granular material to granular material processing equipment where the vacuum loader includes a housing having a granular material intake and a granular material outlet, with the outlet being located for downward gravity-induced flow of granular material to material processing equipment. The loader includes a vacuum motor connected to the housing for drawing vacuum within the housing. A dust filter is connected to the housing and is positioned between the granular material inlet to the housing and a suction intake of the vacuum motor. A reservoir is connected to and located within the housing for temporary storage of pressurized air. The loader further includes apparatus for delivering a blast of air from the reservoir to the interior of the housing, for air flow blasting through the dust filter in a direction opposite to the direction air is drawn through the filter by the vacuum motor.

The air blast delivery apparatus includes a shell having a first aperture communicating with the housing interior, with the shell interior defining a reservoir. The air blast delivery apparatus further includes a closure member within the shell, which closure member is moveable therewithin to close the first aperture upon application of pressurized air thereto in a direction towards the first aperture, and is moveable away therefrom to open the first aperture when application of pressurized air thereto is halted and input air pressure is relieved. The apparatus for delivering the blast of air further includes a seal between the closure member and the interior of the shell, permitting air flow between the shell interior and the closure member towards the first aperture and into the shell interior, but blocking air flow between the shell interior and the closure member in a direction away from the first aperture.

When pressurized air is furnished to the shell via a second aperture, air flows into the shell between the shell interior and the closure member. The pressurized air urges the closure member against the first aperture, closing the first aperture, with pressurized air flowing into the shell to fill the reservoir defined by the shell interior. The pressurized air is blocked by the seal from flowing between the shell interior and the closure member back towards the second aperture. When the pressurized air is no longer being furnished, the closure member moves away from the first aperture due to force exerted on the closure member by pressurized air within the shell, thereby opening the first aperture and allowing pressurized air to escape via the first aperture as an air blast.

In still yet another one of its aspects this invention provides a receiver for delivering granular material to granular material processing equipment where the receiver includes a housing having a granular material inlet, a granular material outlet, and a suction outlet for vacuum to be drawn therethrough, with the granular material outlet being located for downward gravity flow of granular material towards the processing equipment. Such a receiver further includes a dust filter within the housing and connected thereto, positioned between the granular material intake and the suction outlet. The dust filter captures dust carried by the granular material entering the receiver that would otherwise be drawn into the suction outlet. The receiver further includes apparatus connected to the housing for a periodically delivering an instantaneous, powerful air blast into the housing between the dust filter and the suction outlet. This provides a powerful blast of air through the dust filter in a direction opposite the direction that air is drawn through the filter and the suction outlet by the plant vacuum system.

The receiver apparatus for delivering the air blast includes a shell mounted on the exterior of the receiver housing and having a first aperture therein communicating with the receiver housing interior, between the dust filter and the suction outlet, via which the air blast is delivered. The apparatus further includes a closure member retained within the shell interior and moveable therealong to close the first aperture at one extremity of travel, and a seal between the closure member and the shell interior, permitting air flow between the shell interior and the closure member towards the first aperture, but blocking air flow between the shell interior and closure member, along the closure member in a direction away from the first aperture.

Whether the air blast apparatus is being used in a loader or in a receiver, when high pressure air is furnished to the shell interior via a second aperture, high pressure air flows into the shell, passing between the shell interior and the closure member. The closure member is urged by the pressurized air against the first aperture, snapping into contact with the first aperture and closing it, with pressurized air filling the shell interior. The seal blocks air flow past the closure member back towards the second aperture. When pressurized air is no longer furnished to the shell interior via the second aperture, the closure member moves away from the first aperture due to force exerted thereon by pressurized air within the shell, thereby opening the first aperture and allowing pressurized air within the shell to escape as a blast of air from the first aperture.

In still another one of its aspects this invention provides a method for delivering granular resin material to a resin processing machine where the method includes drawing granular resin material under vacuum into a portion of a housing that is separated from the vacuum suction intake by a dust filter. Upon commencing drawing granular resin material under vacuum, the method preferably applies a blast of air to the housing interior to clear a material dump flap of any granular resin material that may have adhered to the dump flap. The method proceeds by continuing the draw of granular resin material under vacuum for a preselected time of sufficient duration to fill the housing with granular resin material to a desired level. The drawing of granular material under vacuum is preferably halted for a preselected time whereupon a blast of air is applied to a housing interior portion, between the suction intake for the vacuum and the dust filter, so that high pressure air passes through the filter in a direction opposite that in which air passes through the filter while traveling to the vacuum suction intake.

Upon receiving a signal indicative of the need to replenish the supply of granular resin material for the resin processing machine, the method preferably proceeds by repeating the steps of vacuum drawing of granular resin material, applying a blast of air to the housing interior to assure that the loader dump flap is clear of resin pellets, continuing draw of granular resin material preferably under vacuum for a time sufficient to fill the housing with resin material to a desired level, halting drawing of granular resin material, and then preferably applying a blast of air between the suction intake and the dust filter thereby to blow dust off the filter.

In operation, in addition to using the air blast for the primary purpose of clearing dust off the dust filter, the invention further operates the air blast mechanism another, second time during each fill cycle, preferably exactly one second after the vacuum motor starts. If resinous pellets have blocked full closure of the dump flap, the vacuum inside the loader will not be high. The initial air burst pops the dump flap open just enough to allow the pellets to clear and drop into the hopper below. The motor then runs and vacuum is used to draw in the pellets. As a result, the loader loads to its fully rated capacity and every cycle is a full load cycle with no wasted cycles. Additionally, motor life is extended due to the vertically orientation of the loader.

In practicing the method, the air blast assuring that the dump flap is clear preferably occurs about one second after the drawing of granular material under vacuum commences. In the method, drawing of material under vacuum preferably continues for about twenty seconds. The preselected time that drawing of granular material under vacuum is halted, while the material is discharged, is preferably about two seconds.

The signal indicative of the need for replenishment of the supply of granular material for the resin processing machine may come from a level sensor located at the processing machine, or may come from the dump flap closing due to influence of a counterweight, or may come from the dump flap reaching an intermediate neutral balanced position at which it actuates a switch.

In yet another one of its aspects this invention involves a method for delivering an air blast where the method preferably directs pressurized air against a moveable closure member in a housing interior to move the closure member to close an air blast delivery aperture in the housing while permitting pressurized air to fill the housing interior, and then halts application of pressurized air against the closure member thereby permitting the closure member to move away from the delivery aperture and permitting instantaneous escape of a blast of high pressure air from the housing via the delivery aperture.

In still another one of its aspects, this invention embraces a vacuum loader for providing granular material to granular material processing equipment where the vacuum loader comprises a housing have a granular material intake and a granular material outlet, with the outlet facilitating downward gravity flow of granular material towards the processing equipment. The loader further includes a loader mounting plate having apertured lugs extending upwardly from the plate, with the lug apertures being aligned. A shaft preferably resides in the apertures of the integral lugs of the loader mounting plate. The loader is preferably tiltable by rotation about the shaft. A pair of vertically elongated apertured webs preferably extend laterally outwardly from the housing proximate the granular material outlet, to support the loader when tilted from the vertical. The web apertures are preferably aligned with and positioned to receive the shaft therein when the loader is positioned on the loader mounting plate. Web surfaces facing outwardly respecting the loader are curved to provide preferable rocking support for the loader as the loader is tilted from a vertical orientation to a tilted position.

The loader preferably comprises two such vertically elongated apertured webs oriented parallel one with another, with the apertures of both webs being aligned to receive the shaft for tilting rotation of the loader thereon.

A major advantage of the invention in one of its aspects is that the bottom or dump flap of the tiltable loader may be weighted so that the flap closes naturally in response to gravity. With known loaders, static electricity may cause pellets of resinous material to tend to stick to the bottom flap. With the tiltable loader of the invention, when the air blast is supplied, the blast is so forceful that it pops open the dump flap, overcoming the counterbalance and clearing any pellets that have stuck to the dump flap due to static electricity or other effects. This greatly improves loader reliability since static electricity causing resin pellets to cling to the dump flap of conventional loaders can cause as many as one-third of the attempts to load resinous material to fail because the dump flap has not sealed, thereby defeating or severely compromising the vacuum draw of resinous material into the loader.

During operation of the tiltable loader, it is desirable to operate the air blast feature of the invention twice during each loading cycle. Typically, after a load of material has been released by the dump flap and the loader is empty, the vacuum motor starts to draw more material into the loader. Once second after the vacuum motor starts, the air blast is actuated thereby clearing any pellets that may have adhered to the dump flap, which could otherwise maintain the dump flap in the open position and defeat the action of the vacuum motor. The dump flap then closes due to the force of gravity acting on the counterbalance provided for the dump flap. Resin material continues to be loaded into the loader with control being effectuated by a timer. Once the timer has sensed that loading has continued for a sufficient period and the required amount of material has been loaded, the vacuum motor is turned off, loading stops and the vacuum level is allowed to drop whereupon resinous material in the loader is discharged as the dump flap opens and allows the material to flow downwardly into the process machine below. Then the air blast is actuated again to blow dust off the filter.

With the vertical orientation of the tiltable loader of the invention, the loader of the invention empties fully on a consistent basis, which is a problem with loaders that do not operate in a vertical orientation. Operation in a straight up, vertical orientation, together with the ability to unlatch and tilt the loader so that the material storage chamber can be accessed easily for cleaning, provides substantial operational efficiencies for plastic resin molders and extruders.

In still another one of its aspects, this invention embraces a vacuum loader for providing granular material to granular material processing equipment, where the loader preferably comprises a housing having a granular material intake and a granular material outlet. The granular material outlet facilitates downward gravity flow of granular material towards resin processing equipment. The loader further preferably comprises a latching web extending outwardly horizontally from the housing above the granular material outlet. A loader mounting plate is provided for positioning the loader on a horizontal surface. A latch mounting lug extends upwardly from the loader mounting plate. A latch is pivotally connected to the mounting lug and is rotatably movable relative thereto between two positions. The latch at a first position contacts the latching web and restrains the loader from tilting. The latch at a second position contacts the latching web and supports the loader when tilted. The latch is weighted to pivotally return to the first position when released.

An embodiment of the invention as disclosed in parent application Ser. No. 12/201,562 provides a high pressure accumulator chamber having a valve that is opened by applying air pressure to a diaphragm through action of a small solenoid. When the valve actuates, it snaps to a fully open position. Opening action of the valve in the this embodiment opens a passageway that is preferably about one (1") inch in diameter, leading from an accumulator chamber to a vacuum loader filter to be cleaned.

The one inch diameter passageway is sufficiently wide that the resulting flow of air through the passageway is "explosive" and is effective as a cleaner, as the "explosive" flow of air uniformly distributes itself over the area of the filter for a brief moment. The result is a blowback device able to remove unwanted particles from the filter of a vacuum loader or other vacuum powered device.

The embodiment of the invention as disclosed in parent application Ser. No. 12/201,562 includes a blowback assembly for attachment to a vacuum loader. The blowback attachment includes a housing, preferably cylindrical in shape, preferably having a high pressure accumulator chamber, a pilot air chamber, a chamber housing the stem of the diaphragm valve and an exhaust conduit preferably leading from the high pressure accumulator chamber to the vacuum loader for selective fluid communication of the high pressure accumulator chamber with an air filter of the vacuum loader. The diaphragm of the diaphragm valve assembly isolates a pilot air chamber. The diaphragm is elastomeric, positioned between the pilot air chamber and the exhaust conduit, and is operatively connected to a valve stem. The valve stem is positioned to close an intermediate passageway, that is approximately 1 inch in diameter, which connects the exhaust conduit and the high pressure accumulator chamber. Sealing engagement of the valve stem in the intermediate passageway is controlled by allowing the elastomeric diaphragm to flex in response to a pilot air introduced into the pilot air chamber.

In the embodiment of the invention as disclosed in parent application Ser. No. 12/201,562, the blowback dust removal attachment may be fabricated using three co-axial cylindrical casing components with a lower cylindrical casing component housing the high pressure chamber, a middle cylindrical casing component housing the valve stem, and an upper cylindrical casing component housing the pilot air chamber. The three cylindrical casing components are retained together by a plurality of rod-like elements such that the interior wall surfaces of the cylindrical casing components form the cylindrical chamber walls. The resulting housing is preferably rigid and able to withstand air pressures in excess of 200 lbs/in².

In the embodiment of the invention as disclosed in parent application Ser. No. 12/201,562, the valve stem is actuated by movement of the diaphragm. Pilot air is supplied to the pilot air chamber by from a source of plant air at low pressure, with pilot air flow into the pilot air chamber controlled by a solenoid actuated valve. The influx of pilot air into the pilot air chamber causes flexing of the diaphragm away from the pilot air chamber, leading to movement and a rapid opening of the valve stem. This actuation of the valve stem opens the passageway connecting the exhaust conduit and the high pressure accumulator chamber so the pressurized gas (typically air), within the high pressure accumulator effectively immediately passes through the exhaust conduit and into a line connected to the vacuum source in which the filter is located. The pressurized gas is thereby directed by the conduit towards the air filter in the line leading to the vacuum source, in a direction opposite that of the normal flow of air therein, thereby blowing dust and undesired particles off the filter.

As pressurized air evacuates the accumulator chamber, the pilot air leaves the pilot air chamber since the solenoid valve, when the solenoid is not actuated, provides open communication with ambient air. This allows the diaphragm to return to its neutral state and the valve stem moves in response to an associated spring to reseal the passageway between the accumulator chamber and the exhaust conduit. High pressure air then resupplies the accumulator chamber with pressurized air and the blowback dust removal attachment is ready for another next cycle.

DESCRIPTION OF THE PREFERRED EMBODIMENTS AND BEST MODE KNOWN FOR PRACTICE OF THE INVENTION

This invention provides apparatus and methods of providing blasts of compressed high pressure air to an air filter of a vacuum powered and vacuum conveying resin transport device wherein high pressure air is applied to a dust filter, in a direction opposite that through which air is drawn by the vacuum, to clear the filter of unwanted particles. The invention specifically provides an extremely compact "blowback" device using a minimum of moving parts to produce a blast of compressed air, in a reverse direction through the filter, to clear the filter of dust and to clear a dump flap of any resin material adhering thereto, and in the preferred embodiment does not employ any diaphragm valve, springs or solenoid actuation of the same. The air blast provided is substantial and of much greater force than can be achieved using one or more diaphragm valves at any reasonable cost.

Figure 1:
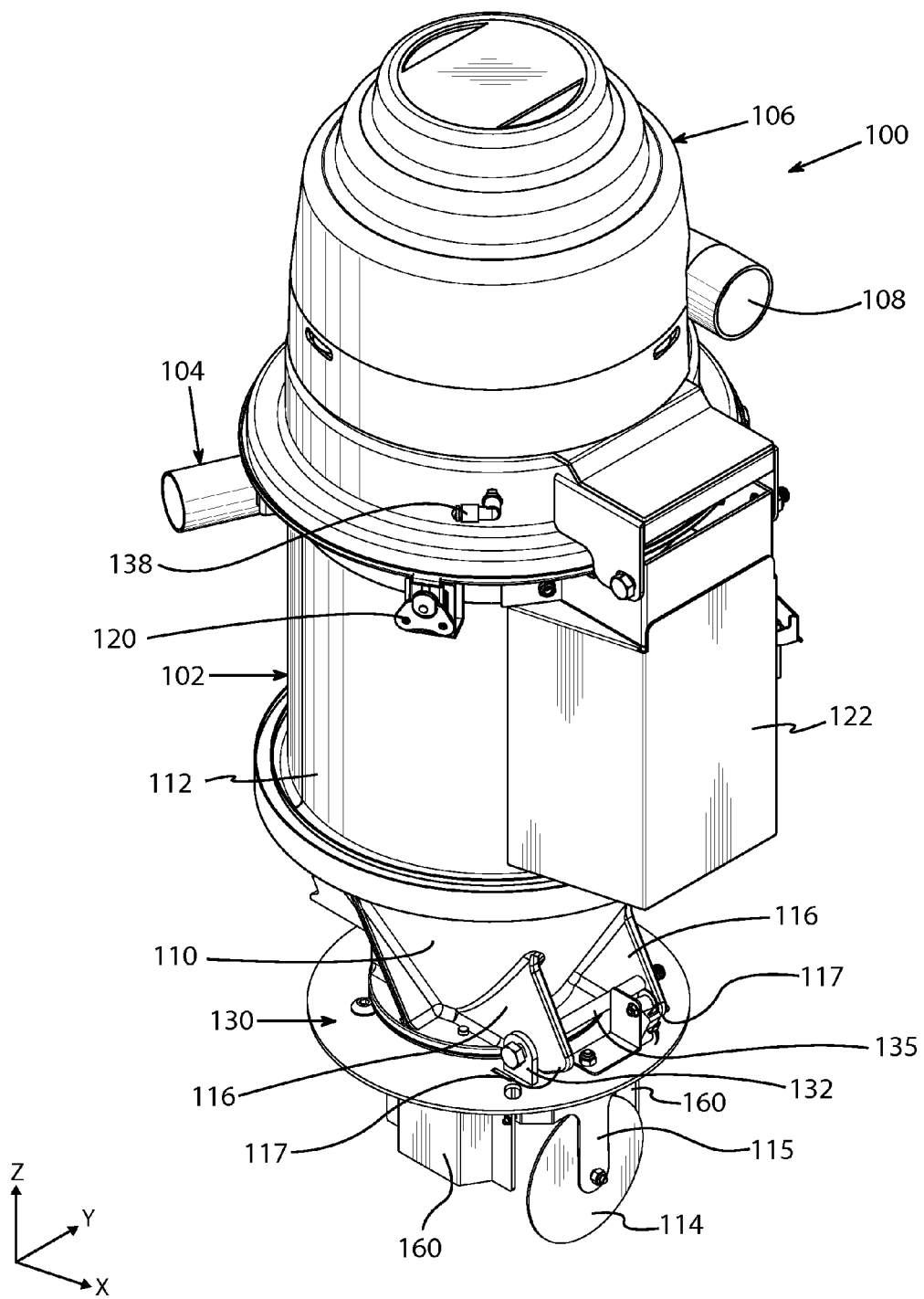
FIG. 1 is an isometric view of a vacuum loader embodying aspects of the invention.

Referring to the drawings in general, and to FIG. 1 in particular, a tiltable vacuum loader embodying aspects of the invention is designated generally 100 and includes a loader housing designated generally 102. Mounted on top of loader housing 102 is a vacuum motor designated generally 106. A resin supply and vacuum inlet is designated generally 104 and is a conduit via which granular resin is supplied via vacuum transmission to the vacuum loader for subsequent downward discharge from the vacuum loader into a gravimetric blender or other granular resin processing device.

Tiltable vacuum loader 100 further includes a vacuum exhaust 108 from vacuum motor 106. Vacuum motor 106 is available from Ametek Corporation.

Loader housing 102 has a lower conical portion designated generally 110 and an upper cylindrical portion designated generally 112. A dump flap 114 is located at the bottom of conical portion 110 and is carried by a dump flap bracket 115 for pivoting motion to open and close a downwardly facing discharge chute 140 (shown in FIGS. 2 and 4) of vacuum loader 100.

Conical portion 110 of loader housing 102 includes a pair of support webs 116 that are generally triangular in shape and are preferably integral with conical portion 110, which is preferably a one piece molded part or a casting, having webs 116 formed as a part thereof when conical portion 110 is fabricated. Conical portion 110 of the housing of loader 100 is preferably an aluminum casting. Cylindrical portion 112 of the housing of loader 100 is preferably a stainless steel cylinder. Housing portions 110 and 112 are secured together by a ring clamp, with is a U-shaped cross-sectional ring that fits across flanges on both section 110 and 112 and pulls those members together when the ring is tightened.

Figure 3:
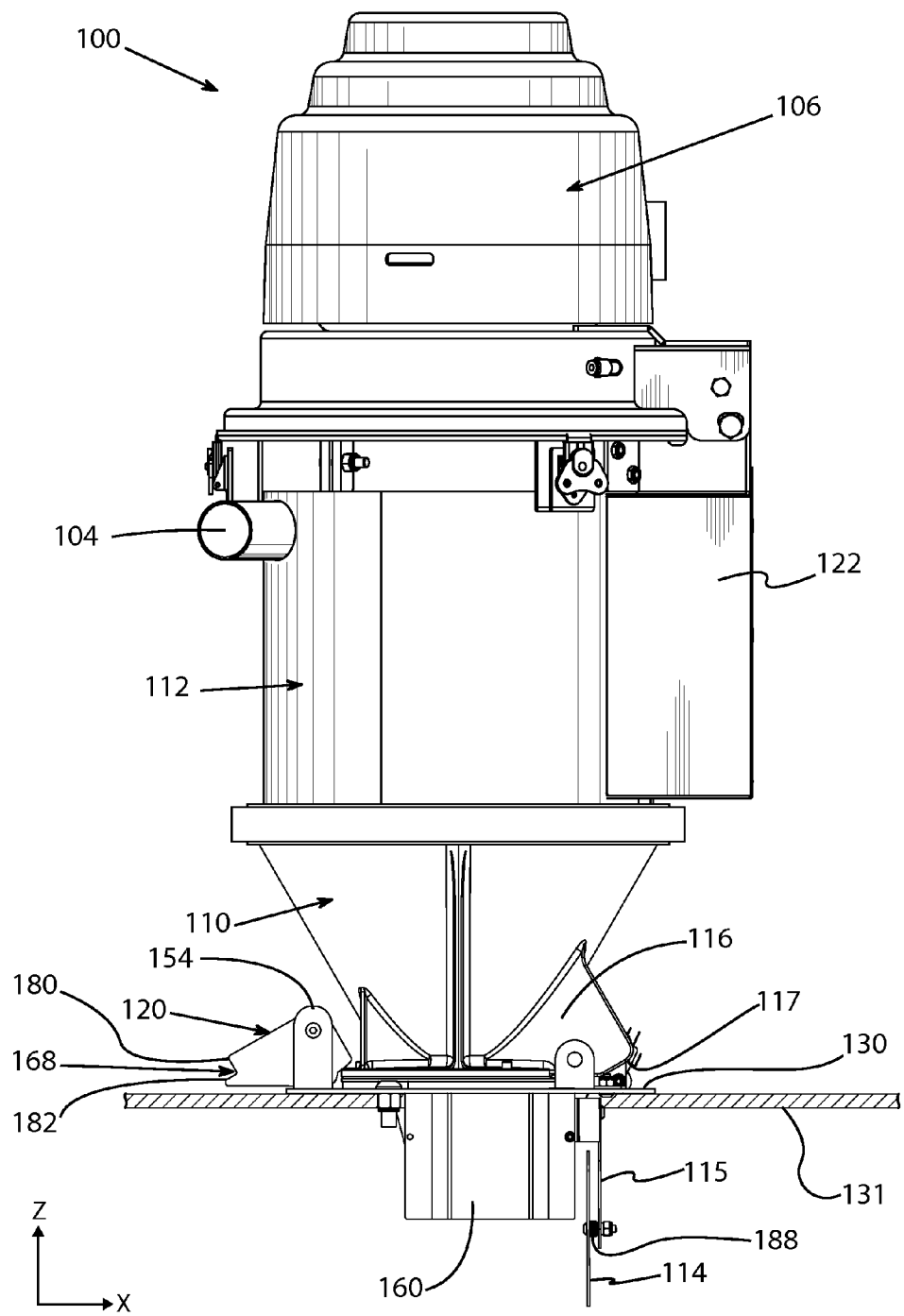
FIG. 3 is a front elevation, looking in the direction of the "Y" axis shown in FIG. 1, of the vacuum loader illustrated in FIGS. 1 and 2.
Figure 4:
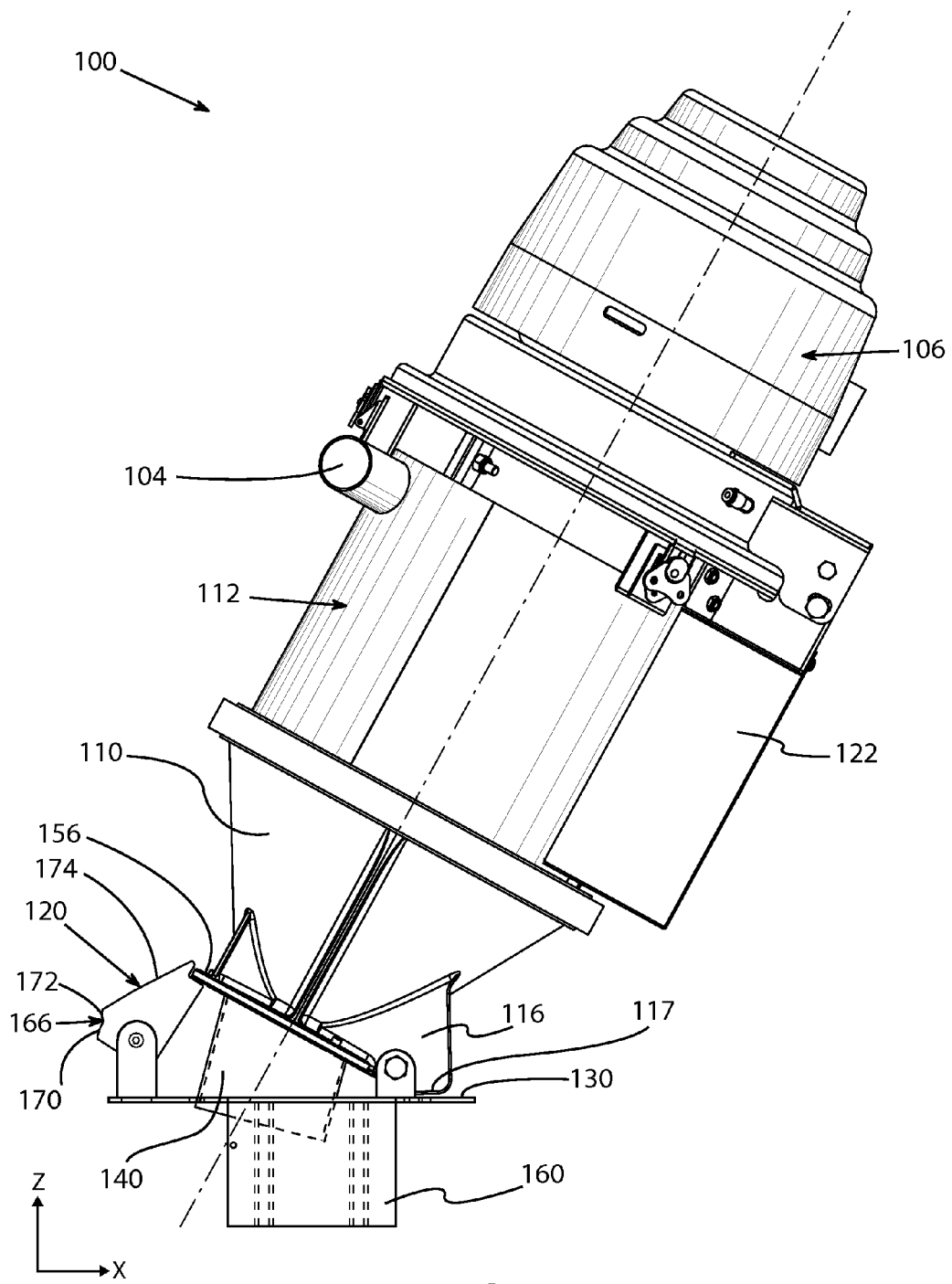
FIG. 4 is a front elevation, looking in the direction of the "Y" axis shown in FIG. 1, of the vacuum loader illustrated in FIGS. 1 through 3, with the loader tilted to facilitate cleaning and with the centerline of the loader illustrated.

Support webs 116 include curved web surfaces designated 117 in FIGS. 1, 3 and 4. Curved web surfaces 117 support tiltable vacuum loader 100 when the loader is tilted for cleaning purposes or maintenance, as shown in FIG. 4.

Figure 8:
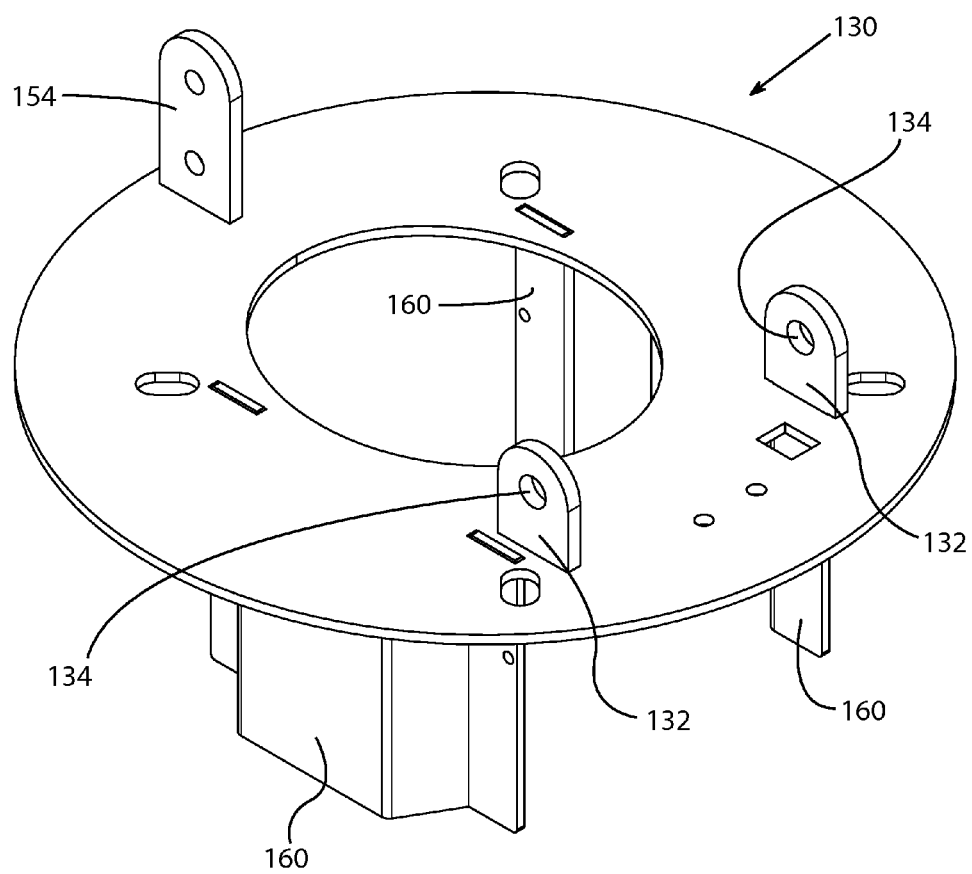
FIG. 8 is an isometric view of a mounting plate for the vacuum loader illustrated in FIGS. 1 through 7.

Tiltable vacuum loader 100 is preferably mounted on a annular mounting plate 130, which is illustrated by itself in FIG. 8 and is also shown in part in FIGS. 1, 2, 3 and 4. Plate 130 in turn is preferably secured about an opening in a horizontal cover of a bin of a gravimetric blender or other resin processing device, where such a cover is denoted 131 and schematically shown in broken section in FIG. 3.

Referring generally to FIG. 8, upstanding from annular mounting plate 130 are a pair of shaft support lugs, each designated 132, which are aligned so that apertures 134 in shaft support lugs 132 may receive a rotatable shaft, namely shaft 135 (shown in FIGS. 6 and 7) about which loader 100 rotates when loader 100 is moved from the upright to the tilted position. Annular mounting plate 130 further includes an upstanding latch mounting lug 154, positioned generally on the opposite side of plate 130, 180 degrees removed from upstanding shaft support lugs 132. Latch mounting lug 154 supports latch 120 for retaining loader 100 in a vertically upright position or for supporting loader 100 when tilted, as best shown in FIGS. 3 and 4. Pivotal connection of latch 120 with latch mounting lug 154 may be effectuated by an suitable mechanical pin, or rivet, or the like.

Extending downwardly from annular mounting plate 130 are a pair of skirts 160 to generally guide the downwardly flowing resin material upon exiting tiltable vacuum loader 100 via a discharge chute 140 and flowing downwardly into a resin processing device.

Tiltable vacuum loader 100 is retained in either the upright operation position, or in the tilted position for cleaning, on annular mounting base 130 by a latch 120. Latch 120 retaining loader 100 in the upright, operating position is illustrated in FIG. 3. Latch 120 retaining and supporting loader 100 in the tilted position for cleaning is illustrated in FIG. 4.

Latch 120, as illustrated in FIG. 3, is of generally 30°-60°-90° triangular configuration, with the 30 degree vertex of the triangle and the 60 degree vertex of the triangle both being truncated and formed to define notch surfaces that respectively retain vacuum loader 100 in the vertical operating position illustrated in FIG. 3, and in the tilted position for cleaning as illustrated in FIG. 4.

The 30° vertex, of what would otherwise be the 30°-60°-90° triangular shape of latch 120, has been shaped or notched as illustrated in FIG. 4 to fit against latching plate 156, in the manner shown in FIG. 3, when loader 100 is in the vertical, operating position. A notch surface 166 shown in FIG. 4 is formed by cutaway of the 60 degree vertex of the right triangle. Notch surface 166 comprises two intersecting, gently curved surfaces, a notch surface first part 170 being approximately twice the length of a notch surface second part 172, with the indent intersection of surfaces 170, 172 being formed to fit against an upper corner of latching plate 156 when loader 100 is in the vertical orientation illustrated in FIG. 3.

When considering FIG. 3 and latch 120 is in the orientation shown, with the upper corner of latching plate 156 fitting into the vertex formed by the intersection of first and second notch part surfaces 170, 172, any attempt to raise or tilt loader 100 about the horizontal axis into the position illustrated in FIG. 4 is prevented by latch 120. Specifically, as loader 120 is rotated counterclockwise respecting FIG. 3 towards the position illustrated in FIG. 4, hypotenuse surface 174 of latch 120, which is illustrated in FIG. 4 but which has not been numbered in FIG. 3 to enhance drawing clarity, upon rotation of latch 120 contacts and interferes with cover 131 of the resin processing device on which annular mounting plate 130 and loader 100 are mounted. Rotation of latch 120 is blocked and loader 100 remains in its vertical orientation as shown in FIG. 3.

Contrasting, when latch 120 is in the orientation shown in FIG. 3, to release loader 100 from latch 120 one need only rotate latch 120 clockwise respecting FIG. 3. The configuration of first and second notch part surfaces 170, 172 and specifically the configuration of first notch part surface 170 permits rotation of latch 120 in the clockwise direction respecting FIG. 3, with first notch part surface 170 sliding along or only slightly interfering with the proximate edge of latching plate 156. Hence, loader 100 may be rotated about shaft 135 into the position illustrated in FIG. 4, where loader 100 may be cleaned.

Once loader 100 has been released from latch 120 in the position illustrated in FIG. 3, latch 120 may be further rotated in the clockwise direction to the position illustrated in FIG. 4, where loader 100 and the weight thereof bearing on the 30 degree vertex notch surface 168 (illustrated and numbered in FIG. 3), serves to retain latch 120 in the position illustrated in FIG. 4. As a result, it is not necessary for a worker involved in cleaning loader 100 to support loader 100 or to hold loader 100 in position while cleaning loader 100.

Thirty degree vertex notch surface 168 includes third and fourth notch surfaces designated 180, 182 respectively in FIG. 3. Third notch surface 180 is a formed perpendicular to the side of the 30°-60°-90° triangle which is opposite the 60 degree vertex. Fourth notch surface 182 is positioned perpendicularly to third notch surface 180 and extends from third notch surface 180 to terminate where fourth notch surface 182 intersects the hypotenuse of the 30°-60°-90° triangularly configured latch 120.

Advantages associated with the loader of the invention are many. The tiltable loader, which operates in a straight up-and-down vertical orientation with the vacuum motor shaft 109 rotating about a vertical axis, permits the vacuum motor to run much more smoothly and reliably with much longer life, since the bearings of the motor are not biased by gravity against the motor shaft, which would be the case if the shaft were at an angle (the motor shaft is depicted schematically and designated 109 in FIG. 2). Gravitational forces on the bearings, urging the bearings against shaft 109 are therefore uniform and symmetrical. Moreover, having the loader operate in a vertical orientation allows resinous material to flow directly through the loader downwardly into the gravimetric blender or other process machine located below the loader. As a result, loader 100 can process materials which flow less easily and could not be processed by a tilted loader or by a loader operating in a tilted position.

Figure 5:
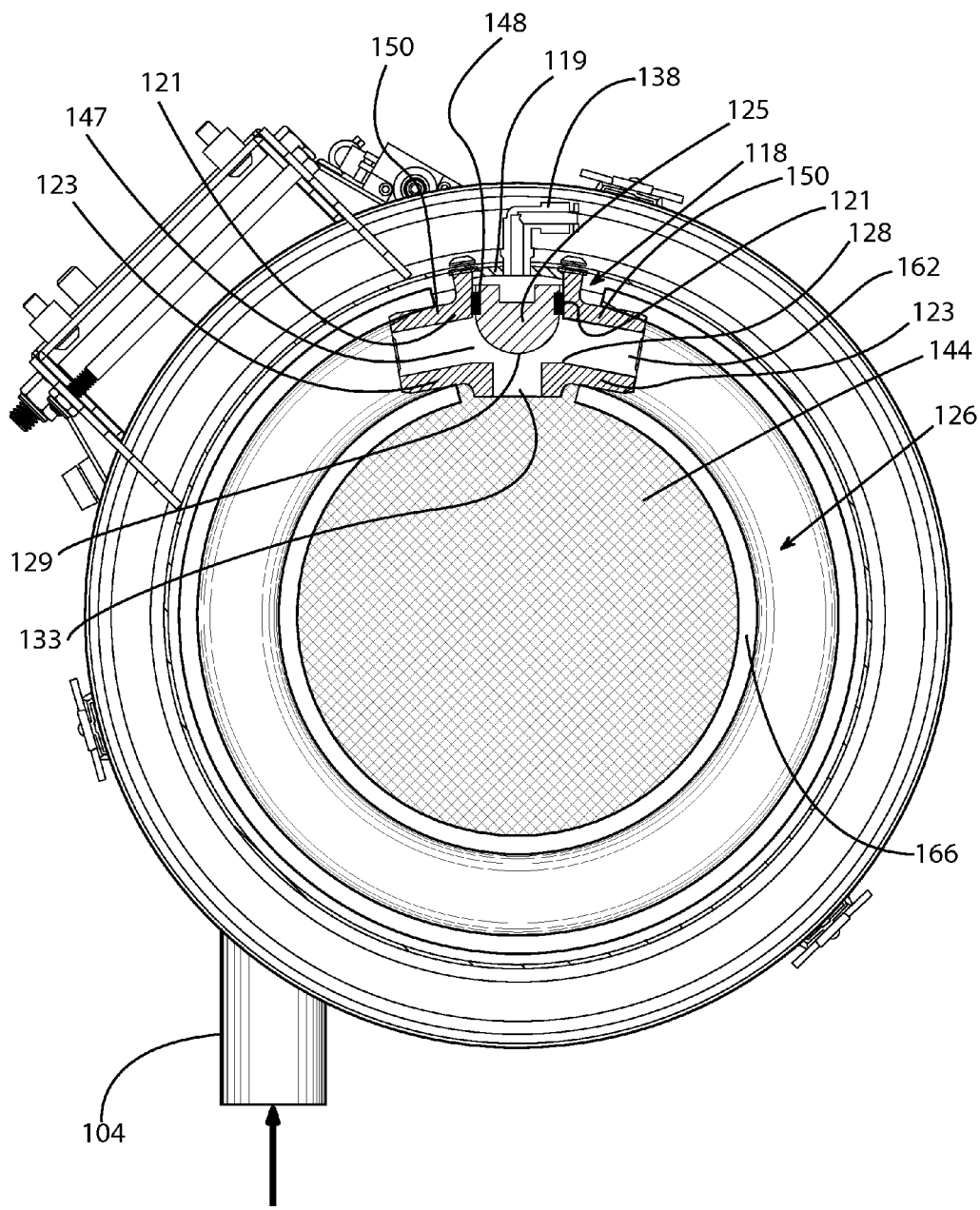
FIG. 5 is a sectional view taken at lines and arrows V-V in FIG. 2.

FIG. 5 illustrates the blowback apparatus portion of loader 100. As shown in FIG. 5, apparatus for delivering an air blast includes an air blast generator housing or shell designated generally 118 to which is connected inlet air fitting 138, which supplies inlet air under pressure to air blast generator housing 118. (The air blast generator housing 118 is sometimes referred to herein as "shell 118", to avoid any confusion with housing 102 of loader 100.) Housing or shell 118 includes a first closure cap designated generally 119 in FIG. 5.

Air blast generator housing 118 further includes interior surfaces 121 closely fitting about a closure member 125 illustrated in FIG. 5, and an apertured forward wall 123. Air blast generator housing shell 118 has been shown with the top portion cut away in FIG. 5 in order to reveal closure member 125, residing slidably within housing 118 in close proximity to the surrounding interior surfaces thereof. Closure member 125 is movable from a position proximate first closure cap 119, as illustrated in FIG. 5, to a position at which a forward facing rounded surface 129 of closure member 125 is in contact with aperture 133 formed in interior surface 128 of apertured forward wall 123. The rounded shape of closure member 125 together with the circular shape of aperture 133 assures a tight seal upon closure member 125 being urged against aperture 133. Apertured forward wall 123 includes aperture 133 therein for discharge of air blasts from air blast generator housing shell 118 against dust filter 144.

Closure member 125 is rounded and may be round or may be "bullet" shaped, namely cylindrical with a rounded end, for closing aperture 133. Closure member is preferably a solid piece of an acetal copolymer sold under the trademark "Celcon".

Figure 16:
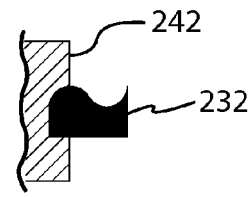
FIG. 16 is a fragmentary sectional view of a cup seal and an edge portion of a moveable member, taken at oval "X" in FIG. 15.

A working seal between closure member 125 and the interior surfaces 121 of shell 118 is provided by a cup seal 148, which permits fluid flow in one direction past seal 148 but precludes fluid flow in the opposite direction past seal 148. The cup seal 148 is round and, like an O-ring, fits in a groove formed in closure member 125. The groove is circumferential and cup seal 148 resides in that circumferential groove so that cup seal 148 seals all the way around closure member 125. The cup seal 148 permits air flow along the surface of closure member 125 from inlet air fitting 138 into the interior 147 of air blast generator housing 118, between cup seal 148 and closely fitting surfaces 121 of air blast generator housing 118. However, cup seal 148 blocks essentially all air flow in the opposition direction, from the interior 147 of air blast generator housing 118 towards inlet air fitting 138. With cup seal 148 there is no significant flow of air back towards inlet air fitting 138. Cup seal 148 has somewhat of a "C" cross-sectional configuration, as illustrated in FIG. 16, with the open side of the "C", namely the cup, oriented towards the pressure side, facing towards outlet aperture 133 from which the air blast emerges. Air pressure within air blast generator housing shell 118 presses on the inside of the "C" of the cup seal, forcing the "C" of the cup seal open and making cup seal 148 seal against the interior surfaces 121 of housing 118 that closely surround closure member 125.

When air is supplied through inlet air fitting 138, air pressure forces the air past the outer surface of cup seal 148. As a result, cup seal 148 seals only against air flow in a single direction. Due to the high pressure of the air as supplied, friction between the combination of moveable member 125 and cup seal 148, and the surrounding closely fitting surfaces 121 of housing 118, against which cup seal 148 seals and along which movable member 125 moves, is not an issue.

When pressurized air is supplied through inlet air fitting 138, closure member 125 moves against aperture 133 in forward wall 123, and forward facing rounded surface 129 of closure member 125 is pressed firmly thereagainst by the pressurized air. As pressurized air continues to be supplied from inlet air fitting 138, pressurized air flows into lateral conduits 162 which are formed in part by forward wall 123, extend laterally from air blast generator housing 118, and communicate with the interior of an annular, sausage-like structure defining a high pressure air reservoir 126. Accordingly, as pressurized air is supplied through inlet air fitting 138, closure member 125 moves from the position illustrated in FIG. 5 into a position with surface 129 facing against and sealing aperture 133 in wall 123. This forward movement of closure member 125 from the position illustrated in FIG. 5 occurs essentially instantaneously as the high pressure air begins flowing through inlet air fitting 138. Flow of high pressure air continues along the surface of closure member 125 between closure member 125, and the interior surfaces 121 of housing 118, into lateral conduits 162. Continued supply of high pressure air via inlet air fitting 138 results in reservoir 126 filling with air at the same high pressure as supplied through inlet air fitting 138.

When it is desired to provide the air blast through aperture 133 in wall 123, air pressure at inlet air fitting 138 is relieved. This causes a pressure imbalance on closure member 125, with closure member 125 instantaneously moving away, in a snap action, from apertured forward wall 123, exposing aperture 133 to high pressure air in the interior of shell 118 and in reservoir 126. As aperture 133 opens, high pressure air in housing 118 and reservoir 126 rushes through aperture 133 in a hundredth of a second or less, producing an explosion of air out of aperture 133, dislodging dust and other debris from dust filter 144.

Figure 2:
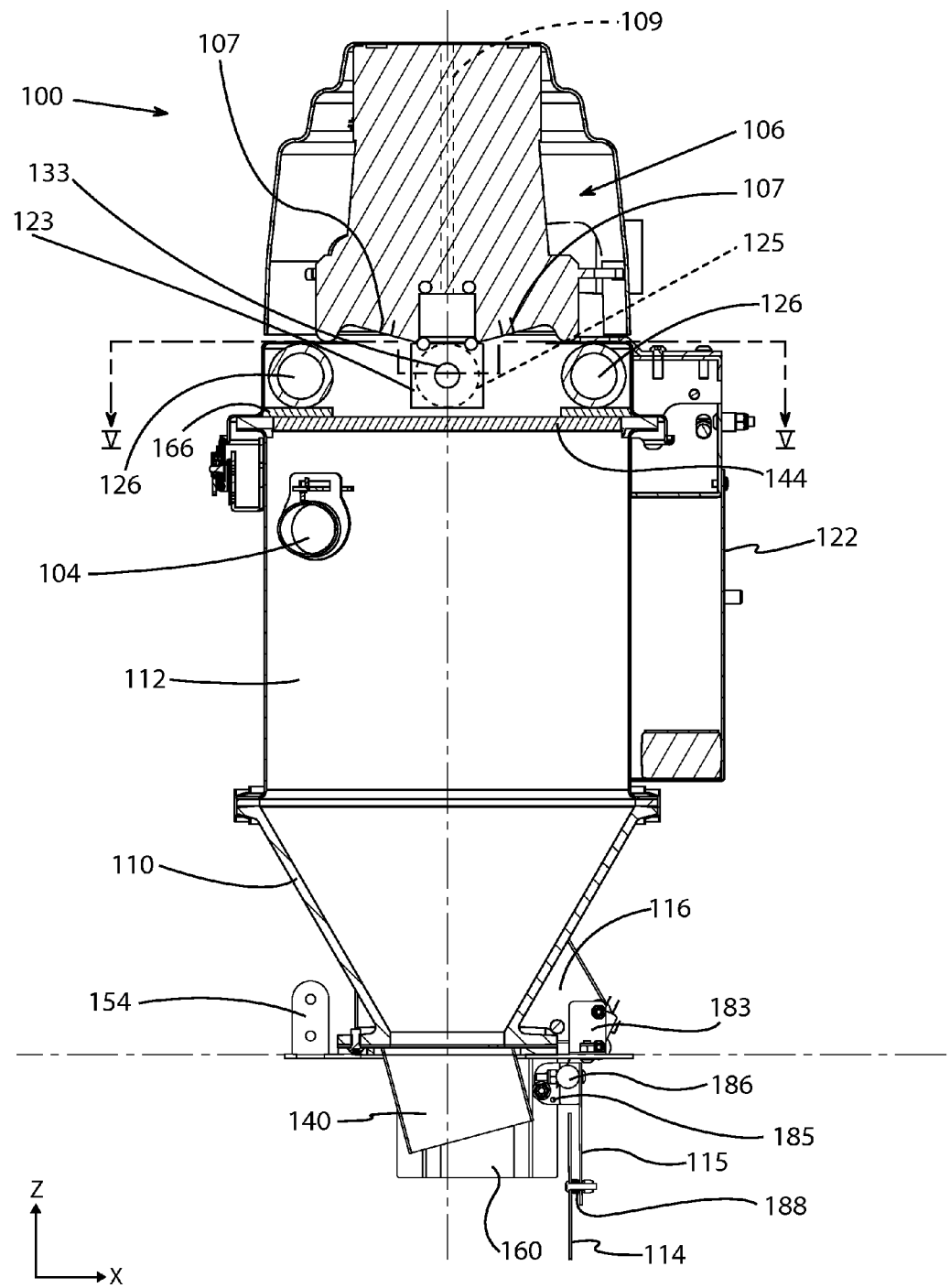
FIG. 2 is a vertical section through the center of the vacuum loader illustrated in FIG. 1, with the section taken in the X-Z plane relative to FIG. 1, and with the centerline of the loader illustrated.

Referring to FIGS. 2 and 5, dust filter 144 is located above resin supply and vacuum intake 104. Vacuum motor 106 draws vacuum in turn drawing resin material loaded with dust into loader 100 through resin supply and vacuum inlet 104. As a result of the intermediate positioning of dust filter 144, between resin supply and vacuum inlet 104, and suction intake 107 to vacuum motor 106 (suction intake 107 is illustrated schematically in FIG. 2), dust associated with the resin material entering via inlet 104 will be drawn upwardly and caught by dust filter 144 before the dust can enter suction intake 107 to vacuum motor 106. When reservoir 126 is filled with high pressure air and the air pressure at inlet air fitting 138 is relaxed, and closure member 125 moves away from surface 128, air then rushes out of aperture 133 in hundredths of a second as an extremely forceful air blast. The air blast instantly fills the volume above filter 144, blasting dust accumulated in filter 144, and particularly on the bottom surface thereof, loose, so that the dust falls downwardly within cylindrical portion 112 of housing 102 and into conical portion 110 of housing 102, from where the dust may be discharged together with resin as the resin flows downwardly into the gravimetric blender or other processing machine below tiltable vacuum loader 100.

Figure 6:
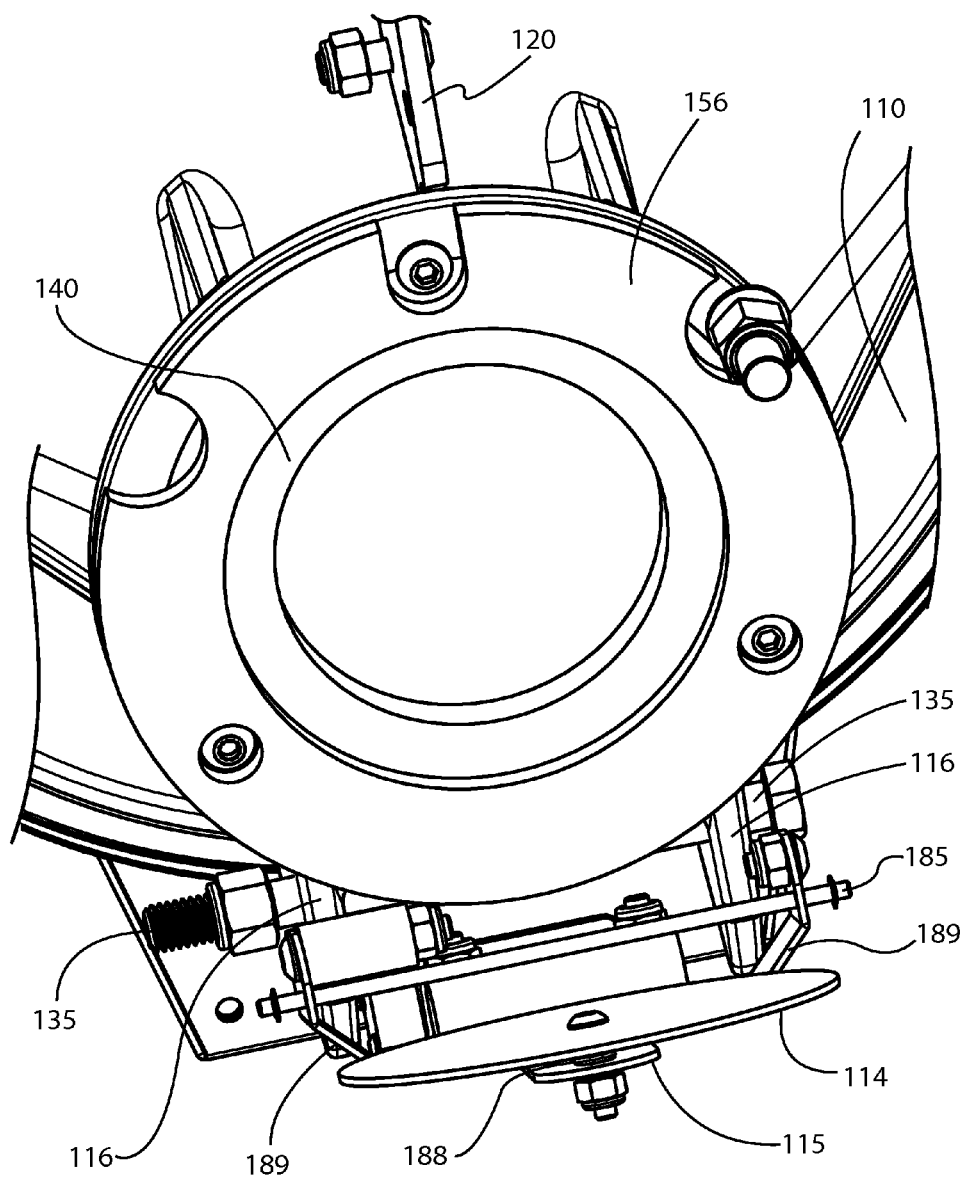
FIG. 6 is a broken isometric view of the lower portion of the vacuum loader illustrated in FIGS. 1 through 5, taken looking upwardly from a position offset from the centerline of the loader.
Figure 7:
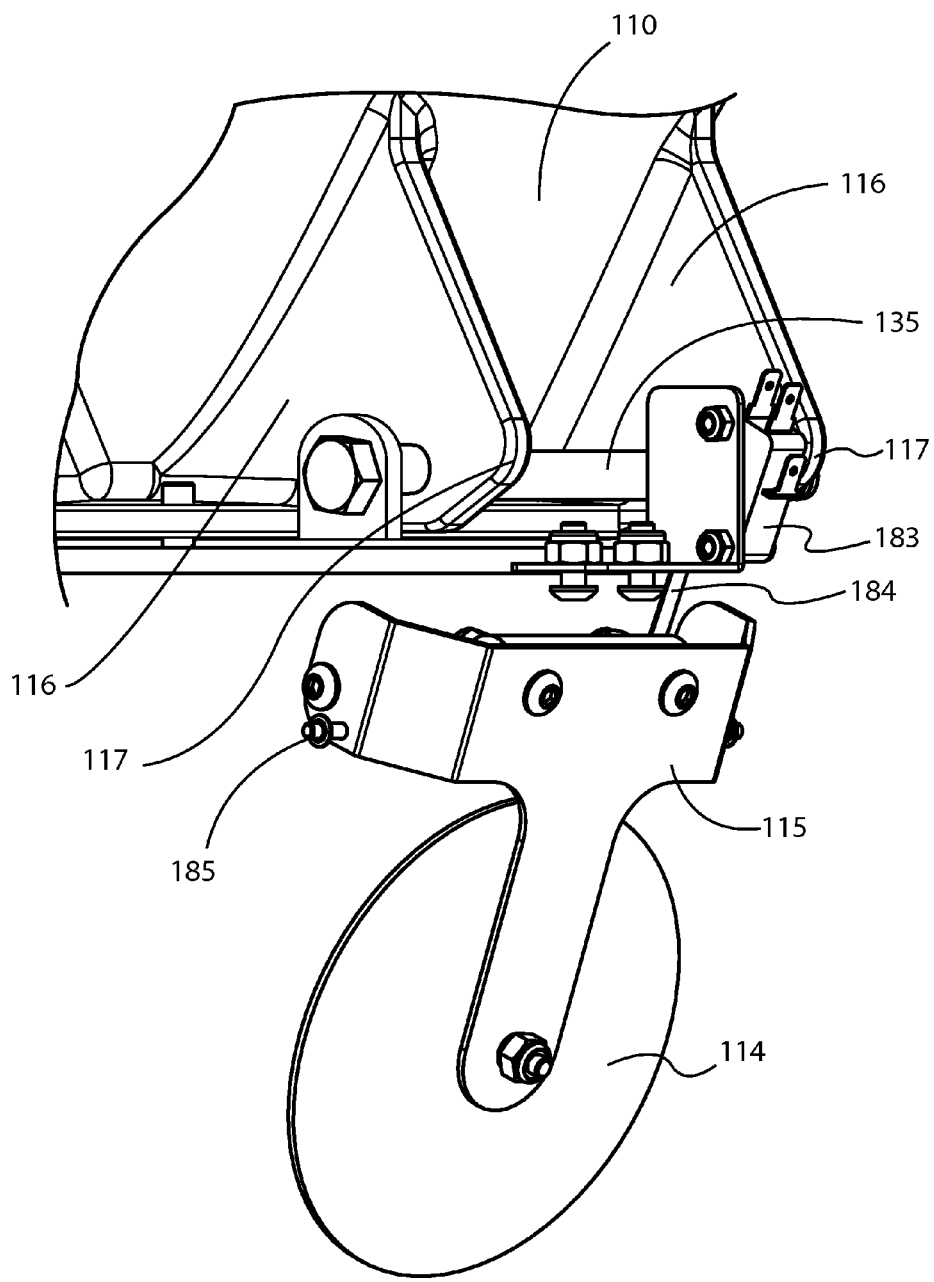
FIG. 7 is an isometric view of the dump flap and associated structure illustrated in FIG. 6.

A dump flap 114 is mounted on a dump flap bracket 115, as shown at the bottom of FIG. 2 and in FIGS. 6 and 7. A dump flap O-ring 188 separates dump flap 114 from dump flap bracket 115, providing cushion and play between dump flap 114 and mounting bracket 115, assuring that when dump flap 114 closes against downward discharge chute 140, dump flap 114 self-adjusts to fit closely about the periphery of discharge chute 140, creating a seal therebetween.

Referring principally to FIGS. 6 and 7, dump flap 114 is carried by dump flap bracket 115, which is mounted for pivotal movement on and respecting dump flap pivot shaft 185. Dump flap pivot shaft 185 is connected to loader 100 by mounting brackets 189 illustrated in FIG. 6, with dump flap pivot shaft 185 being journaled for freely rotatable motion relative to mounting brackets 189. Mounting brackets 189 are secured to loader 100 by conventional nut and bolt assemblies not numbered in the drawings.

The dump flap assembly, and specifically a dump flap counterweight 186, is positioned for contact with an actuator reed 184, which is a part of a switch 183. Dump flap counterweight 186, shown in FIGS. 2 and 7, is preferably positioned with respect to actuator reed 184 such that when dump flap 114 is open (having been forced open by material flowing downwardly out of loader 100 once the vacuum in housing 102 has been relieved), actuator reed 184 is not contacted by counterweight 186 and switch 183 is off. Once material has emptied from loader 100, the force of dump flap counterweight 186 preferably swings dump flap 114 towards the closed position. Dump flap 114 preferably swings through its balanced, at rest position, somewhat like a see-saw, and bumps against discharge chute 140, jarring free any resin material that may still be clinging to dump flap 114 due to static electricity. A secondary blowback blast of air to clear dust filter 144 of debris also serves to blow any remaining material off dump flap 114, further insuring that any remaining clinging material is cleared from dump flap 114.

When dump flap 140 has returned to the neutral position, in balance with counterweight 186, actuator reed 184 is tripped by counterweight 186. This energizes switch 183, thereby initiating microprocessor timing for another fill of material into loader 100. Switch 183 actuates the microprocessor to regulate the operation of the vacuum motor 106, keeping vacuum motor 106 on for the duration of the preset timer time. Actuator reed 184 is desirably tripped by the counterweight 186 of dump flap 114 when dump flap 114 is in the balanced, equilibrium position, where the dump flap is not in contact with the discharge chute but is hanging in balance with the counterweight.

Dump flap bracket 115 pivots together with dump flap counterweight 186 about pivot shaft 185, the end of which illustrated in FIG. 2. When dump flap 114 is fully open, having been opened by downward flow of resinous material through discharge chute 140, with dump flap 114 being in the position illustrated in FIGS. 1 and 2, actuator reed 184 is in a position at which switch 183 is not actuated. Once downward discharge of material has concluded, as noted above dump flap counterweight 186 causes the dump flap assembly to rotate about pivot shaft 185 to a position at which dump flap 114 is close to, but has not closed, discharge chute 140. At this potion, actuator reed 184 is contacted by dump flap counterweight 186 and switch 183 is actuated to start vacuum motor 106. As vacuum is drawn by vacuum motor 106 and granular material is drawn into the body of 120 of loader 100 through resin supply and vacuum intake 104, the vacuum drawn within loader housing 102 preferably causes dump flap 114 to seat against and seal discharge chute 140. One second after this occurs, a timer actuates the blowback air blast to briefly open dump flap 114, removing any resin pellets that may have adhered to dump flap 114 as a result of static electricity or otherwise.

As apparent from the foregoing, the preferred sequence of operation, commencing with loader 100 being full of resinous material, is as follows:

Vacuum motor 106, having operated for the prescribed time set by a timer associated with the microprocessor, is shut off by the timer/microprocessor combination, thereby halting delivery of resinous material into loader 100.

With vacuum no longer being drawn, air enters housing 102 of loader 100.

In the absence of vacuum within housing 102 of loader 100, dump flap 114 is no longer retained by vacuum in the position closing discharge chute 140. As a result, due to the action of dump flap counterweight 186 and the weight of the resinous material in housing 102 of loader 100 bearing on dump flap 114, dump flap 114 swings open, permitting downward flow via discharge chute 140 of the resinous material out of housing 102 into a gravimetric blender or process machine located below. The dump flap counterweight does not contact and hence does not trigger actuator reed 184 and hence switch 183 is not actuated at this time, when dump flap 114 is in the fully open position, having been forced into such position by the resinous material falling through discharge chute 140.

Blowback is actuated to clear filter 144 of dust by relieving air pressure at inlet air fitting 138 thereby resulting in movable member 125 opening aperture 133 with an air blast coming out of aperture 133.

High pressure air is again supplied via fitting 138, moving member 125 to close aperture 133, resulting in refill of reservoir 126 and the interior of housing 118 with high pressure air, in preparation for release of another air blast.

Since there is no vacuum retaining dump flap 114 in position against discharge chute 140, the dump flap 114-dump flap counterweight 186 combination swings back and forth in a see-saw action, until reaching an equilibrium position at which the dump flap counterweight contacts actuator reed 184, thereby energizing switch 183, triggering the microprocessor/timer combination, which turns on vacuum motor 106. Vacuum motor 106 draws vacuum in housing 102, beginning the draw of resinous material into housing 102 and causing dump flap 114 to be drawn into position contacting and closing discharge chute 140.

One second after the vacuum motor begins drawing vacuum and resinous material begins to enter housing 102, the timer actuates the blowback by relieving air pressure at inlet air fitting 138 thereby resulting in movable member 125 opening aperture 133, thereby releasing a blast of air into housing 102, serving to briefly open discharge flap 114 and jar loose any resinous material sticking thereto. Since blowback is essentially instantaneous and the vacuum motor has just started drawing vacuum, actuating the blowback to clear dump flap 114 of any resinous material adhering thereto, does not materially affect the continued draw of vacuum and the feeding of material into housing 102.

High pressure air is again supplied via fitting 138, moving member 125 to close aperture 133, resulting in refill of reservoir 126 and the interior of housing 118 with high pressure air, in preparation for release of another air blast.

The vacuum motor continues to draw vacuum in housing 102 and to draw resinous material into housing 102. The drawn vacuum maintains the dump flap 114 sealed against the discharge chute 140. The vacuum motor continues to draw vacuum and to load resinous material into housing 102 until the microprocessor/timer turns vacuum motor 106 off, when loader 100 has been sufficiently filled with resinous material according to the microprocessor/timer and the preset time as set forth therein.

It is further to be understood that the counterbalance for the dump flap can be arranged so that the dump flap closes fully in response to the counterweight, as contrasted to the approach set forth above.

The time from start to finish of a typical fill cycle using loader 100 of the invention is in the neighborhood of 20 to 25 seconds. Typically the vacuum motor runs for about 20 seconds to fill loader 100 with resinous material. Normally, about 2 seconds elapse after termination of vacuum motor operation before the second air blast is supplied to clear dust from the filter. This 2 second time interval allows the vacuum level within the loader to drop. The first actuation of the air blast is, as stated above, about 1 second after the vacuum loader commences operation. The fill of loader 100 commences again upon the microprocessor receiving a signal, either from a level sensor in the bin of a blender below or from the dump flap closing due to the counterweight, as detailed above. Accordingly, when loader 100 is supplying material to a process machine, the frequency of operation of loader 100 depends on the speed with which the process machine, to which the resinous material is being supplied, uses that resinous material.

Figure 15:
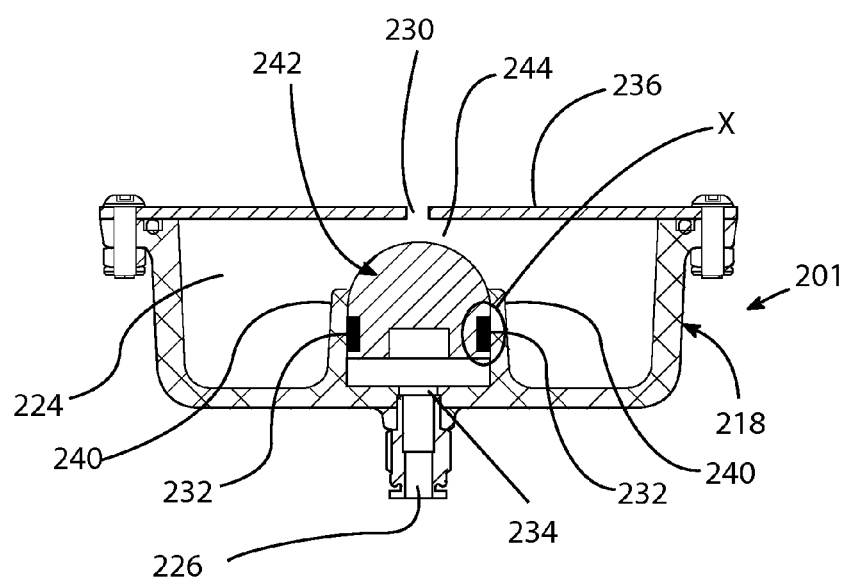
FIG. 15 is a vertical section of the blowback assembly illustrated in FIG. 14 taken though the center of the blowback assembly.

In the practice of the invention, the volume of the reservoir, whether it be reservoir 126 as illustrated in FIG. 5 or reservoir 224 defined by the interior of air blast generator 201 illustrated in FIG. 15 should be between about 30% and about 50% of the volume of the space that will be pressurized by the release of the burst of air above the dust filter. Normally, the aperture through which the air blast is supplied should be at least ½ inch diameter and preferably as large as ¾ inch diameter.

A reservoir volume at 30% to 50% of the volume of the space above the filter avoids overstress of the filter when the air blast is applied. If the air reservoir is too large, the air blast is so powerful that damage results to the filter. The approach of the invention using a reservoir to store high pressure air and then release the high pressure air in an explosive burst, provides a substantial advantage over the approach of using a solenoid valve and merely using the solenoid valve to release air from the facility air supply against the filter in an attempt to clear dust from the filter. In systems that use a solenoid or diaphragm valve and take air directly from the facility air supply, the long air line from the facility air compressor typically slows the rate of air delivery so that when the solenoid valve opens, pressure of the air delivered by the solenoid against the dust filter is perhaps 30 pounds per square inch lower than the supply. However, with the reservoir approach of this invention, this does not occur, since the pressurized air is in the loader or receiver and hence is immediately available to be applied as a high pressure air blast against the dust filter.

Typically solenoid valves have 1/16 inch or 1/8 inch diameter openings, and when used to try to clear dust filters, provide only very focused air streams that are effective to clear the dust only where the air stream strikes the filter. Contrasting, the invention provides a blast of air that is so large and powerful that the entire surface of the filter is exposed to the high pressure air and the entire filter is therefore cleaned.

Release of the pressurized air in the loader of the invention occurs very quickly. While the time has not been measured, it is estimated that the duration of the air blast is perhaps one-hundredth of a second or even less.

While there is no industry standard, facility air supplied to the vacuum loader of the invention to provide the air blast is typically about 100 lbs. per square inch.

Figure 9:
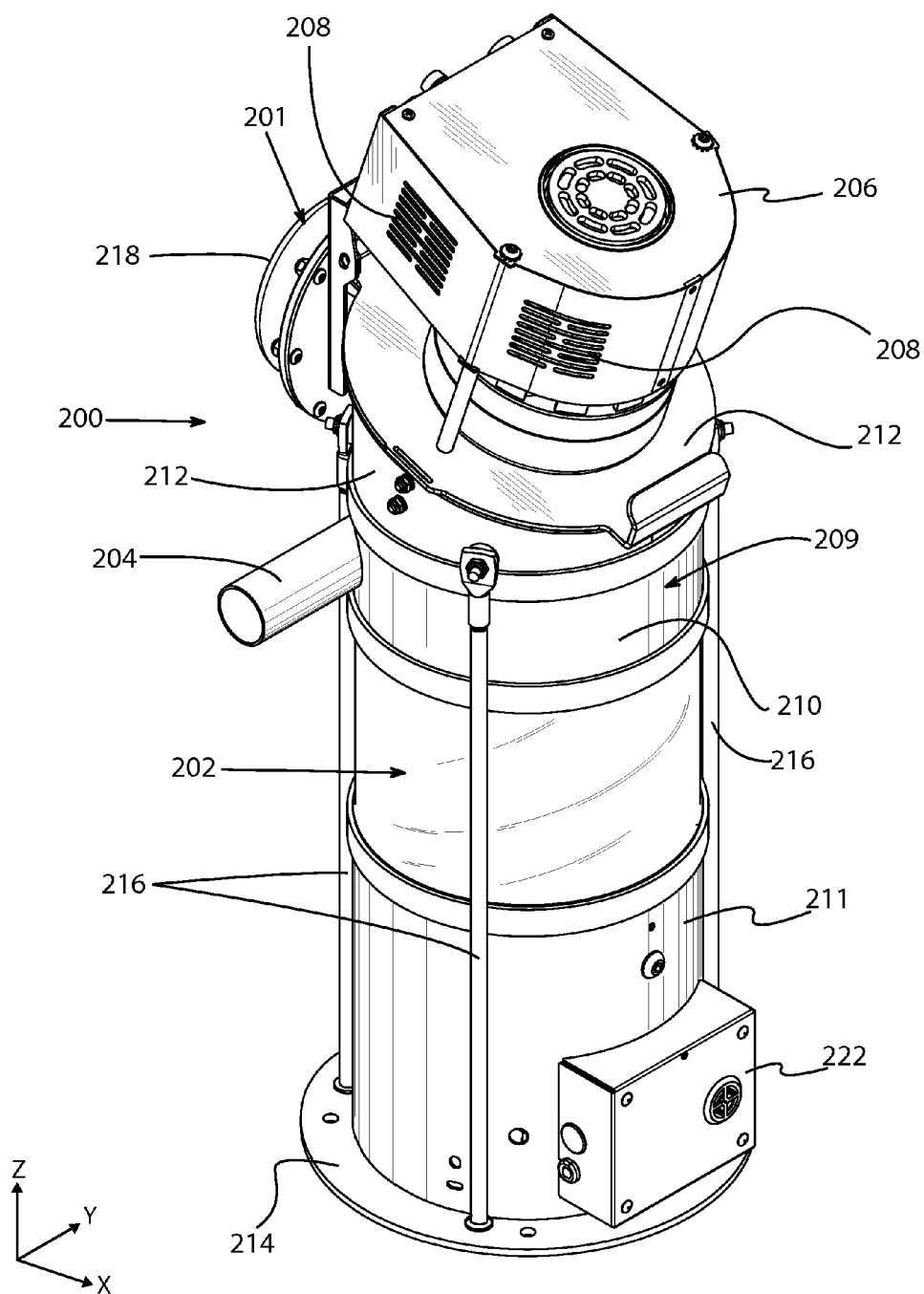
FIG. 9 is an isometric view of another vacuum loader embodying aspects of the invention.
Figure 10:
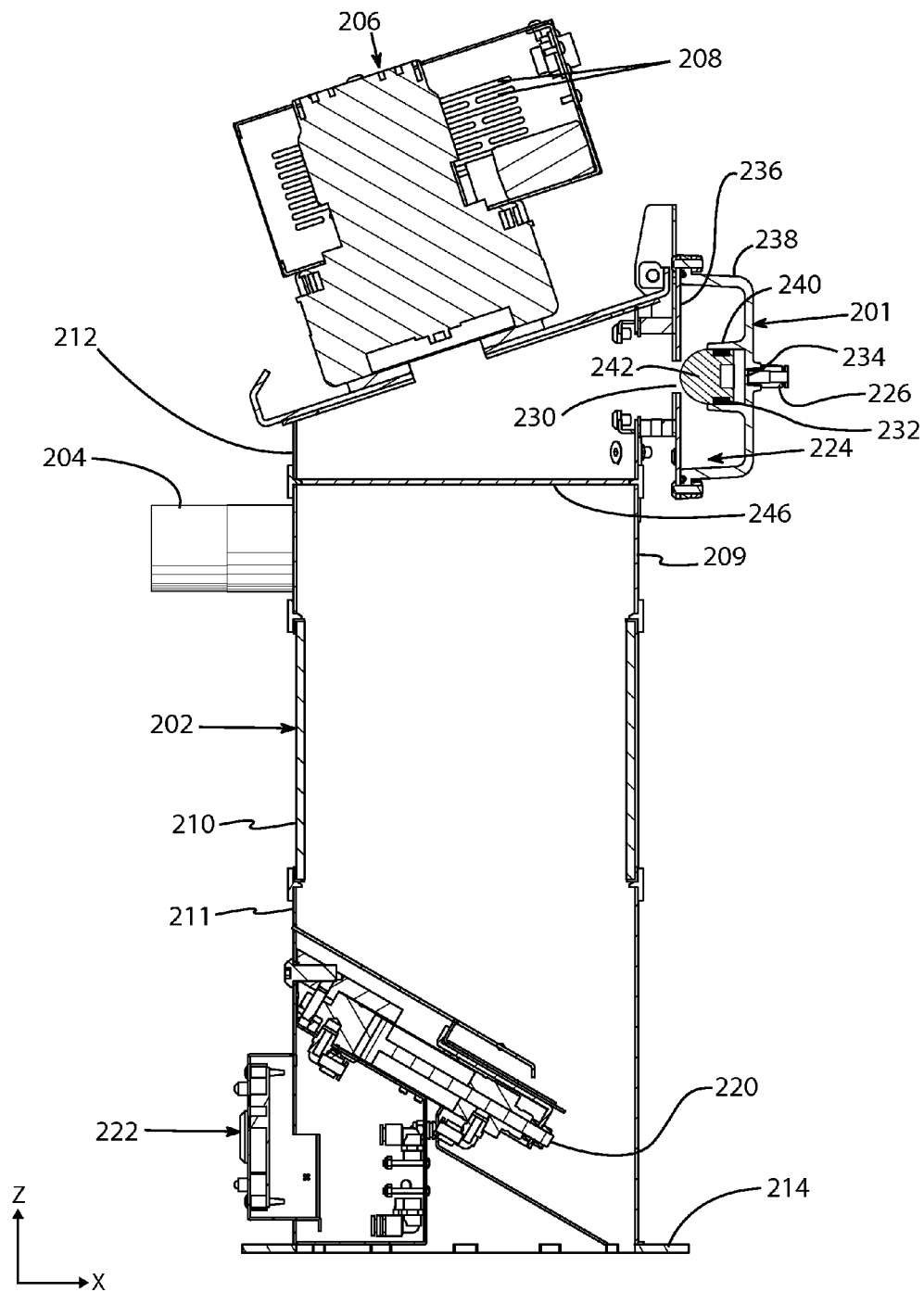
FIG. 10 is a sectional view of the vacuum loader illustrated in FIG. 9 taken through the center of the vacuum loader, perpendicular to the Z-Y plane and parallel to the Z-X plane of the coordinate system illustrated.
Figure 11:
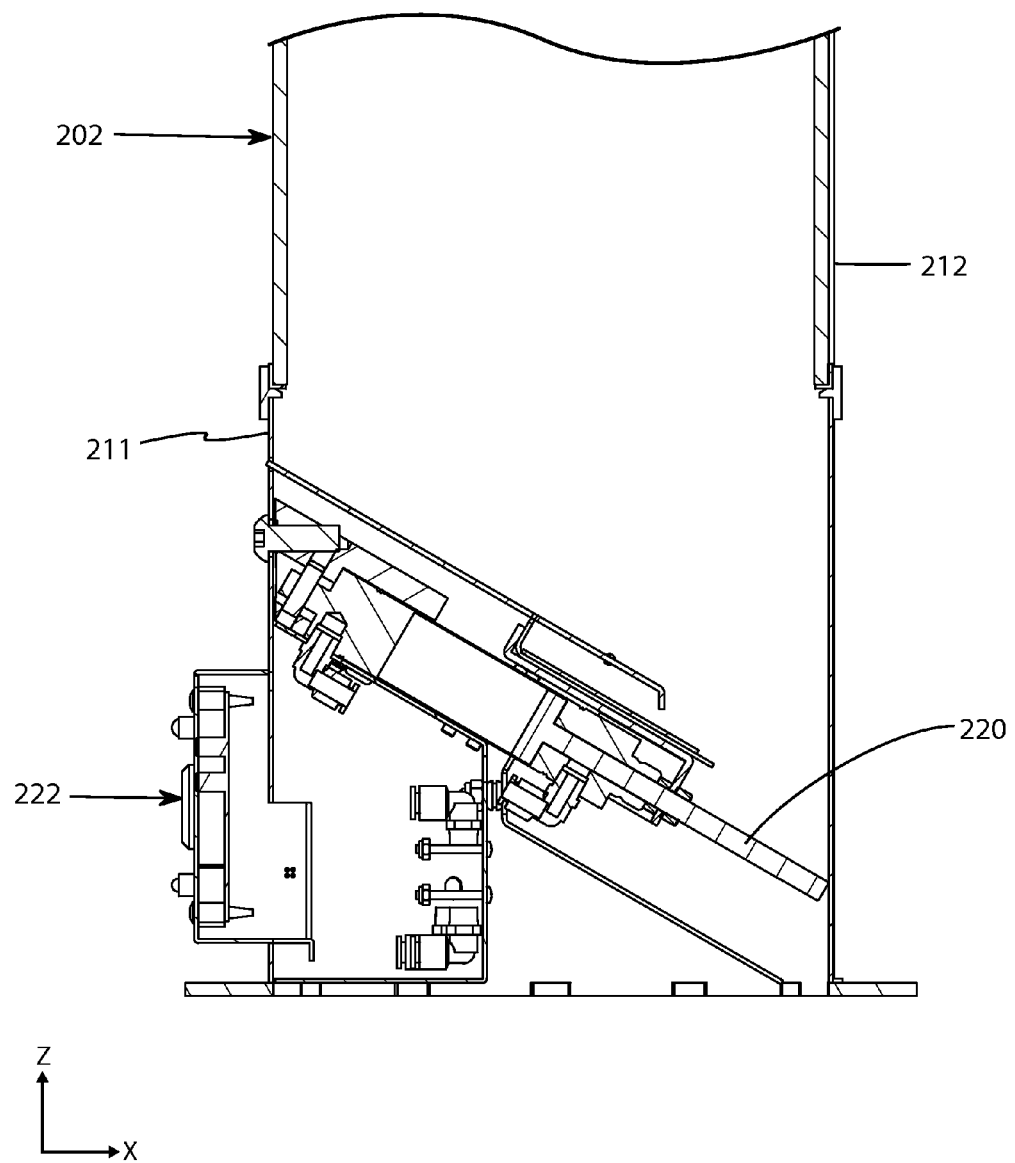
FIG. 11 is a broken sectional view of the lower position of the vacuum loader illustrated in FIGS. 9 and 10 showing the slide gate of the vacuum loader in an extended position.

Referring generally to FIGS. 9, 10 and 11, an additional embodiment of a vacuum loader embodying aspects of the invention is designated generally 200, with the loader housing being designated generally 202. A resin supply line, via which resin is supplied under vacuum in the same manner as described respecting loader 100 above, is designated 204. Vacuum loader 200 includes a vacuum motor 206, with the exhaust for the vacuum motor designated 208. The housing 202 for the vacuum loader 200 includes a first cylindrical portion 209, a second cylindrical portion 210, and a third cylindrical portion 211, all as illustrated in FIG. 9. Vacuum loader 200 further includes a vacuum motor support portion 212 of housing 202, on which vacuum motor 206 is mounted. Vacuum loader 200 further includes a base 214. Tie down rods 216 secure together portions 209, 210 and 211 of housing 202, together with vacuum motor support portion 212 of housing 202. Conventional nuts and bolts are desirably used to secure tie down rods in place. The construction of housing 202 is essentially identical to that of the loader housing shown herein for parent application Ser. No. 12/201,562.

Loader 200 includes a dust filter shown schematically in FIG. 10 and designated generally 246. Dust filter 246 is located between resin supply line 204 and the vacuum inlet to vacuum motor 206 so that vacuum drawn by vacuum motor 206 encounters dust filter 246. Specifically dust filter 246 separates vacuum motor support portion 212 of loader housing 202 from first cylindrical portion 209 of loader 200, with an air blast generator 201 being mounted as shown in FIGS. 9 and 10. Air blast generator 201 includes a housing shell designated generally 218 in FIG. 10. A control box for operation of loader 200 is designated generally 222 in FIGS. 9 and 10.

Loader 200 is equipped with a conventional slide gate 220 actuated by a pneumatic piston that opens and closes the bottom of loader 200, to release resinous material for downward flow into a process machine located below loader 200. Control box 222 controls the operation of loader 200, sequencing the operation of vacuum motor 206 together with actuation of air blast generator 201 so as to clear dust filter 246 of dust at the conclusion of each fill cycle.

An air blast housing shell is designated generally 218 in FIGS. 9, 10 and 11. A control box for operation of vacuum loader 200 is designated generally 222 in FIGS. 9, 10 and 11.

Figure 14:
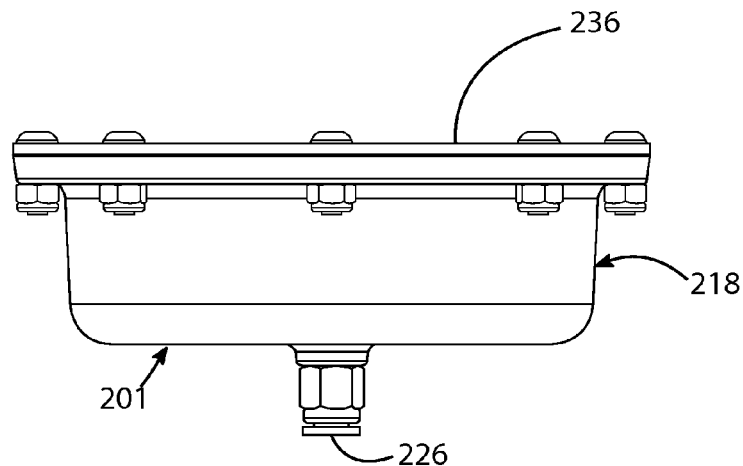
FIG. 14 is a front elevation of a blowback assembly manifesting aspects of the invention.

Air blast generator 201 is illustrated in section in FIGS. 10 and 15 in which inlet air fitting 226 is clearly visible. Inlet air fitting 226 feeds air from an outside source; fitting 226 defines a second aperture 234. Air blast generator 201 includes a blast housing shell designated 218 within which a closure member 242 resides. Blast housing shell 218 is of generally cup-like configuration as illustrated in FIGS. 14 and 15, having three sides preferably formed out of a single molded plastic or cast piece. A fourth side is defined by a plate 236 secured to cup-like portion 238 by conventional screw-nut combinations, some of which are shown but have not been numbered in the drawing to enhance drawing clarity.

Space within cup-like portion 238 defines an air reservoir designated generally 224 in FIG. 15. Formed as a part of cup-like portion 238, and protruding inwardly into reservoir 224 from the area around inlet aperture 234, is a circumferential guide 240. Fitting within guide 240 is a movable closure member 242.

An air blast outlet aperture 230 is shown in FIG. 15 and is located at the central portion of plate 236 in FIG. 15. Closure member 242 is movable towards and away from air blast outlet aperture 230. Lateral movement of closure member 228 is constrained by circumferential guide 240. Closure member 242 has a rounded surface 244 for complemental flush fitting against the circular edge of aperture 230 in plate 236 when closure member 242 is in position abutting the inside surface of plate 236, closing aperture 230.

A seal between closure member 228 and guide 240 is provided by a circumferential cup seal which, as described above respecting the embodiment illustrated in FIGS. 1 through 8, permits air flow in one direction past the seal but precludes air flow in the opposite direction, past the seal. The cup seal permits air flow along closure member 242 in a direction from second aperture 234 towards air blast outlet aperture 230, but precludes air flow along closure member 242 in the opposite direction, towards second aperture 234.

When pressurized air is supplied via second aperture 234, closure member 242 moves vertically upwardly, considering FIG. 15, in response to the force created thereon by the pressurized air in contact therewith as respecting FIG. 15, into a position tightly closing air blast outlet aperture 230. As pressurized air continues to be supplied to the interior of shell 218 through second aperture 234, the air flows between guide 240 and the surface of closure member 242, past cup seal 232, which permits air flow in the direction from second aperture 234 towards air blast aperture 230. However, since closure member 242 has closed air blast outlet aperture 230, air pressure continues to build within reservoir 224, defined generally by the interior of cup-like portion 218. Air pressure continues to increase until pressure within reservoir 224 reaches a high level, equal to the pressure of air being supplied via second inlet air fitting 226 and second aperture 234 to reservoir 224.

When it is desired to provide an air blast out of blast aperture 230, air pressure at inlet air fitting 226 is relieved. This causes a pressure imbalance on closure member 242, with closure member 242 snapping away from plate 226, opening air blast outlet aperture 230 for the high pressure air within reservoir 224. When air blast outlet aperture 230 opens, high pressure air in reservoir 224 blasts through outlet aperture 230 in a microsecond, producing an explosion of air out of aperture 230, clearing dust from dust filter 246.

As high pressure air exits reservoir 224 as a blast, the pressure in reservoir 224 drops to atmospheric pressure. High pressure air is then again supplied to second aperture 234 via inlet air fitting 226, whereupon the incoming air moves closure member 242 against the interior of plate 236, closing air blast aperture 230 and commencing refill of reservoir 224 with high pressure air. From this point, the cycle repeats. Closure member 242 and cup seal 232 are preferably identical in structure and operation to closure member 125 and cup seal 148 illustrated in FIG. 5 and described above.

Figure 12:
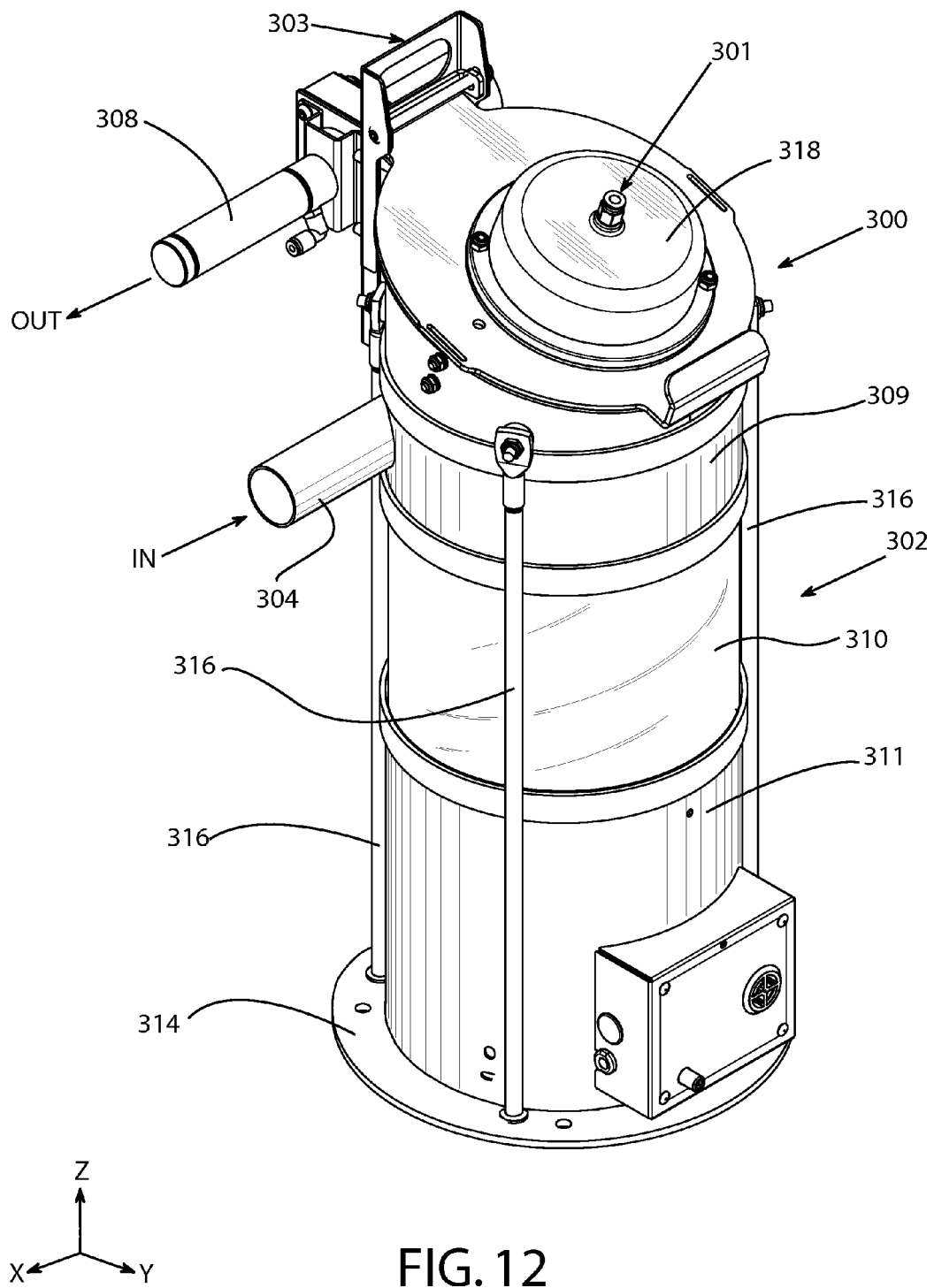
FIG. 12 is an isometric view of a receiver embodying aspects of the invention.
Figure 13:
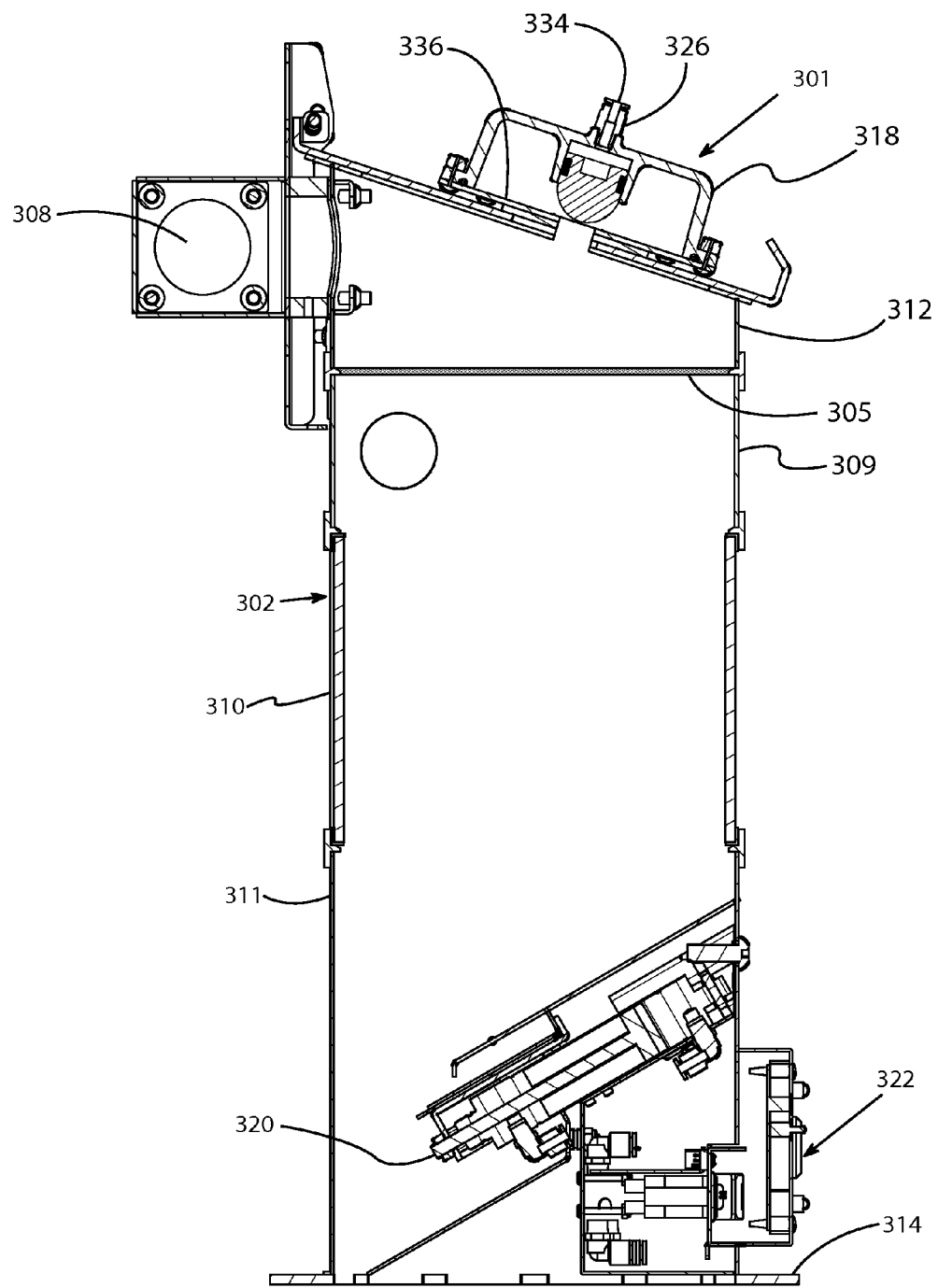
FIG. 13 is a vertical section through the center of the receiver illustrated in FIG. 12, with the section parallel with the Y-Z plane shown in FIG. 12.

Referring generally to FIGS. 12 and 13, a receiver embodying aspects of the invention is designated generally 300, with the receiver being equipped with an air blast generator designated generally 301, and with the receiver further including a housing designated generally 302. A resin supply line designated 304 conveys resinous material to the receiver in much the same manner as respecting loader 100 described above and loader 200 described above. However, receiver 300 does not have a vacuum motor, but rather depends on a vacuum source elsewhere in the plastic resin processing facility to draw vacuum through resin exhaust line 308. A valve assembly 303, the internal parts of which are not illustrated in the drawings, is conventional and interrupts the vacuum drawn through resin exhaust line 308 as necessary in the course of operation of receiver 300.

Housing 302 of receiver 300 includes a first cylindrical portion designated generally 309, a second cylindrical portion designated generally 310 and a third cylindrical portion designated generally 311, where these cylindrical portions correspond generally to similarly shaped top, intermediate and bottom cylindrical portions of loader 200 illustrated in FIG. 10 and partially in FIG. 11. Second cylindrical portion 310 is preferably a transparent material to facilitate operator inspection of the operation of receiver 300 and the presence and level of resinous material in receiver 300.

Receiver 300 is mounted on a base 314 and is assembled using tie rods 316 secured at top and bottom by nuts and bolts in a conventional manner.

Receiver 300 includes a dust filter shown schematically in FIG. 13 and designated generally 305. Dust filter 305 is located between resin supply line 304 and resin exhaust line 308 so that vacuum drawn through resin exhaust line 308 encounters dust filter 305. Specifically dust filter 305 separates first cylindrical portion 309 of receiver housing 302 from top portion 312 of receiver 300, on which an air blast generator 301 is mounted as shown in FIGS. 12 and 13. Air blast generator 301 includes a housing shell designated generally 318 in FIGS. 12 and 13. A control box for operation of receiver 300 is designated generally 322 in FIGS. 12 and 13.

Air blast generator 301 and shell 318 preferably correspond identically to the air blast generator 201 shown as a part of loader 200 in FIGS. 9, 10 and 11 and as shown in detail in FIGS. 14 and 15. As with the air blast generator illustrated in FIGS. 9, 10 and 11, an inlet air fitting 326 feeds air from an outside source, with fitting 326 defining a second aperture 334. Air blast generator 301 includes a shell 318 within which a closure member, not numbered in the drawings but identical to that illustrated in FIG. 15 resides. Shell 318 is of generally cup-like configuration and is preferably identical to that illustrated in FIGS. 14 and 15 and designated 218 therein. Identically to that illustrated in FIGS. 14 and 15, shell 318 has three sides preferably formed from a single piece of molded plastic or a casting. A fourth side is defined by an apertured plate 336 secured to the blast housing shell 318 by conventional screw-nut combinations, some of which are shown in FIG. 13 but have not been numbered in the drawing to enhance drawing clarity. Structure and operation of air blast generator 301 are identical to that described above for air blast generator 201.

Receiver 300 is equipped with a conventional slide gate actuated by a pneumatic piston that opens and closes the bottom of receiver 300 thereby to release resinous material for downward flow into a process machine located below receiver 300. Control box 322 controls the operation of receiver 300, sequencing the operation of valves in vacuum valve assembly 303, together with actuation of air blast generator 301 so as to clear dust filter 305 of dust at the conclusion of each fill cycle of resin material into receiver 300, in the manner described above for loader 200. Slide gate 320 is pneumatically operated and preferably corresponds to the slide gate illustrated as a part of loader 200 in FIGS. 9, 10 and 11.

Referring to Figures A through G, a vacuum loader as disclosed in parent application Ser. No. 12/201,562 is illustrated with a blowback assembly designated generally 5 and a vacuum source designated generally 10. In Figures A through D, the blowback assembly 5 is illustrated in greater detail. As illustrated in these figures, blowback assembly 5 includes a housing that is cylindrically shaped and includes at least three separate cylindrical casing segments designated generally 15, 25, and 30 which are preferably coaxial, contiguous, and coupled together by internal rod elements 31.

Referring to Figure B, the first cylindrical casing segment 15 includes a preferably cylindrical wall with an open upper end 16 and an open lower end 17, with an open passageway therebetween. This passageway forms an accumulator chamber 60 of blowback assembly 5. To form accumulator chamber 60, a bottom disk 20 is sized to concentrically fit within an open lower end 17 of first cylindrical casing segment 15. Bottom disk 20 includes a lip 23 with a diameter approximately the same as the exterior of first cylindrical casing segment 15. Lip 23 retains bottom disk 20 within lower end 17 of first cylindrical casing segment 15. Spaced between lip 23 and lower end 17 of first cylindrical casing segment 15 is a seal, which may be an O-ring or a rubber gasket, or equivalent structure. The seal provides a fluid-tight connection between lower end 17 and bottom disk 20, thereby closing lower end 17 of first cylindrical casing segment 15.

Bottom disk 20 further includes a pressurized air fitting 21. Fitting 21 is preferably received within a hole 22 that is generally centered in bottom disk 20. Fitting 21 desirably threadedly engages hole 22. Fitting 21 may be L-shaped such that one end may be received by bottom disk 20 and the remaining end may receive a pressurized air hose, not illustrated in the drawings. Fitting 21 receives pressurized air flowing into an accumulator chamber 60 of first cylindrical casing segment 15. Fitting 21 is removably secured to a pressurized air hose.

Referring to Figures A through G, coupled to open upper end 16 of first cylindrical casing segment 15 and closing the upper end of the accumulator chamber 60, is a second cylindrical casing segment 25. Second cylindrical casing segment 25 has a cylindrical wall with an open upper end 26, an open lower end 27, and a passageway extending therethrough. While second cylindrical casing segment 25 is preferably of external diameter that is the same as the external diameter of the cylindrical casing segment 15, open lower end 27 of second cylindrical casing segment 25 is of slightly reduced diameter, to interconnect with and be received by first cylindrical casing component 15.

As shown in Figures B and D, open lower end 27 of second cylindrical casing segment 25 is desirably a slightly stepped-down diameter, such that the stepped down portion is approximately the same diameter as the interior of first cylindrical casing segment 15, while the remainder of the second cylindrical casing segment 25 is the same external diameter as first cylindrical casing segment 15. The stepped-down diameter portion 27 of second cylindrical casing segment 25 concentrically fits within and frictionally engages the interior surface of first cylindrical casing segment at open upper end 16 of the first cylindrical casing segment 15 such that the two cylindrical casing segments connect. A sealing mechanism, such as an O-ring or a gasket, is slidingly engaged over the stepped down portion of the second cylindrical casing segment 25 such that, when the first and second cylindrical casing segments 15, 25 are connected, the sealing mechanism provides a fluid seal therebetween.

While upper end 26 of second cylindrical casing segment 25 is open, as illustrated in Figure B, similarly to open lower end 27, end 26 is also of reduced diameter. Upper end 26 of second cylindrical casing segment 25 further includes an annular flange 28 extending perpendicularly inwardly from the cylindrical side wall of second cylindrical casing segment 25, and has a reduced diameter opening passing therethrough. Annular flange 28 may be integrally molded as a part of second cylindrical casing segment 25, or may be a separate element or insert that is adhesively bonded or otherwise fixed to the open upper end 26 of second cylindrical casing segment 25. Preferably, annular flange 28 is beveled approaching the center opening therein so as to form a conical shape. This conical shape facilitates movement of valve stem 35 with the diaphragm valve assembly.

Open upper end 26 of second cylindrical casing segment 25 is also adapted to receive a third cylindrical casing segment 30, which is similar in size to first and second cylindrical casing segments 15 and 25. As shown in Figures A through D, third cylindrical casing segment 30 has a closed upper end 32 and an open lower end 33 defining a cavity. The cavity serves as a pilot valve chamber and receives bursts of pressurized air to open and close the accumulator. Open lower end 33 of third cylindrical casing segment 30 has a relatively uniform external diameter that is approximately the same as the external diameter of second cylindrical casing segment 25. Third cylindrical casing segment 30 is secured to second cylindrical casing segment 25 by tie rods 31. A diaphragm 50 of the solenoid-actuated valve system is secured between third cylindrical casing segment 30 and second cylindrical casing segment 25 to form a fluid seal therebetween.

As illustrated in Figures A and C, the third cylindrical casing segment 30 may further include an air hose fitting 34 extending therefrom. Fitting 34 is preferably received in the side wall of the third cylindrical casing segment 30 by a hole or it may alternatively be in top wall 32 of third cylindrical casing segment 30. Fitting 34 preferably threadedly engages the wall of third cylindrical casing segment 30. The externally facing end of fitting 34 is adapted to receive a pressurized air hose, not shown in the drawings. Accordingly, fitting 34 acts as a conduit for conveying pressurized pilot air into a pilot valve chamber, which is defined by the interior cavity of the third cylindrical casing segment 30.

Each of the three cylindrical casing segments may be any material that can withstand high pressure conditions without compromising the integrity of the cylindrical casing components 15, 25, 30. Each cylindrical casing component is constructed to withstand pressure greater than 200 pounds per square inch.

The exterior surfaces of the cylindrical casing segments are preferably of uniform diameter of approximately 3 inches. Each cylindrical casing component may be of any length. The preferred final length of the assembly, e.g. the axial length of all three cylindrical casing segments combined, is approximately nine and three-sixteenths (9 and 3/16) inches. Most preferably, the first cylindrical casing segment provides the longest part of the housing such that the accumulator chamber 60 is the largest of the open volumes within the cylindrical casing segments. The second cylindrical casing segment provides a slightly smaller internal open volume with the third providing the smallest internal open volume.

As noted above, and illustrated in Figure D, the three cylindrical casing segments 15, 25, 30, when assembled, form a plurality of chambers therein. As seen in FIGS. 2 and 4, the chambers are formed by the exterior walls of the first, second and third cylindrical casing segments, the interior surface of second cylindrical casing segment 25 and by diaphragm 50.

Referring to Figure D, interior walls extending from annular flange 28 of second cylindrical casing segment 25 in part define a first interior chamber 40 and a second interior chamber 45. First interior chamber 40 extends from and is in fluid communication with the reduced diameter opening of upper open end 26 of second cylindrical casing segment 25. This chamber is preferably cylindrical with a longitudinal axis co-axial with that of second cylindrical casing segment 25. First interior chamber 40 is preferably sized to receive a spring mechanism 55 such as the coil spring shown in the drawings.

At the opposing end of first chamber 40 is opening 41 As shown in Figure D, opening 41 provides a passageway from first chamber 40 into second chamber 45. First chamber 40 and second chamber 45 are in fluid communication with each other by way of opening 41. Opening 41 is preferably of reduced diameter relative to that of first chamber 40. The diameter is defined by annular shoulder 42 extending perpendicularly from chamber 40 walls to form opening 41. As illustrated in FIG. 4, shoulder 42 provides support for spring 55, facilitating functioning of diaphragm valve assembly 35.

Second chamber 45 is also cylindrical. However, the longitudinal axis of second chamber 45 is perpendicular to those of both first chamber 40 and second cylindrical casing segment 25. As further shown in Figure D, at one end of second chamber 45, opening 41 leads to first chamber 40. In addition to opening 41, second chamber 45 further includes a second opening 46 and a third opening 47. Second opening 46 is preferably in direct opposition to opening 41. Second opening 46 is formed proximate lower end 27 of second cylindrical casing segment 25 such that second opening 46 provides a fluid communication pathway between second chamber 45 and lower end 27. Furthermore, as illustrated in Figure D, when first cylindrical casing segment 15 and second cylindrical casing segment 25 are interconnected, the walls forming second opening 46 serve to separate the second cylindrical chamber segment 45 from first cylindrical casing segment housing accumulator chamber 60 and form a passageway therebetween. This passageway is preferably approximately one inch (1") in diameter so as to maximize the volume of pressurized fluid reaching the targeted filter.

The interior walls at second opening 46 are preferably beveled at approximately a 45 degree angle. This bevel facilitates sealing engagement with a sealing element 52, forming a part of the diaphragm valve assembly so as to define a valve between the chambers of second cylindrical casing segment 25 and accumulator chamber 60, and the first cylindrical casing segment 15. The beveled portion of second opening 46 engages an opposing beveled portion of sealing element 52 to provide a removable seal between accumulator chamber 60 of first cylindrical casing segment 15 and the chambers of the second cylindrical casing segment 25.

The third opening 47 of the second interior chamber 45 is provided through a side wall of the second cylindrical casing segment 25. Based on the illustrated orientation of second cylindrical chamber segment 45, third opening 47 is perpendicular to opening 41, second opening 46, and the longitudinal axis of the second chamber 45. As further illustrated in Figures E and F, third opening 47 is adapted to align with a chosen inlet or outlet of the vacuum source 10. Most preferably, third opening 47 is adapted to communicate with the chosen inlet or outlet of the vacuum source 10 such that pressurized air flow exiting second interior chamber 45 by way of third opening 47 is directed toward and through the filter for the vacuum source 10 to eliminate unwanted particles therein.

As indicated above, extending through the second cylindrical casing component is a diaphragm valve assembly. The diaphragm valve assembly 35 includes a diaphragm 50, a valve stem 51, a sealing element 52, a coupling mechanism 53, an O-ring 54, and a spring 55 wherein the assembly is sized to extend between the upper end 26 of the second cylindrical casing segment 25 to and through the third opening 46 of the second chamber 45. Diaphragm 50 is a disk-shaped element with diameter that is equal to that of the exterior diameter of second and third cylindrical casing segments 25, 30. Diaphragm 50 is sized to extend between upper end 26 of the second cylindrical casing segment 25 and lower end 33 of third cylindrical casing segment 30 such that when third cylindrical casing segment 30 is coupled to second cylindrical casing segment 25, diaphragm 50 forms a fluid seal therebetween, diaphragm 50 acts as a sealing member between second and third cylindrical casing segments 25, 30.

Diaphragm 50 further as disclosed in patent application Ser. No. 12/201,562 provides isolation of pilot valve chamber 36, within third cylindrical casing segment 30. Diaphragm 50 is preferably an elastomeric polymer which is adapted to retain its elasticity when flexed, without rupturing under high pressure conditions. The material used to manufacture diaphragm 50 is adapted to both flex along annular flange 28 of second cylindrical casing segment and along the beveled portion contained therein and return to a normal flat condition in response to rapid pressure fluctuations and without rupturing Extending perpendicularly from diaphragm 50 is valve stem 51. Valve stem 51 is cylindrically shaped with a uniform diameter that is slightly smaller than that of opening 41. Valve stem 51 is sized to extend from diaphragm 50 through first and second chambers 40, 45 of second cylindrical casing segment 25 to and through second opening 46 of second chamber 45. Valve stem 51 is a relatively rigid and inflexible material, desirably a metallic composition, and coupled to diaphragm 50. Valve stem 51 may be bonded or glued to diaphragm 50 or secured to diaphragm 50 using mechanical coupling means, so as to maintain the seal between second and third cylindrical casing segments 25, 30 during operation.

Coupled to the end of valve stem 51 opposing diaphragm 50 by coupling mechanism 53 is sealing element 52, which is preferably a disk-shaped polymeric composition selected and sized to provide sealing engagement for second opening 46 from accumulator chamber 60. One end of sealing element 52 is preferably beveled, to sealingly engage the opposing beveled region of second opening 46. The beveled portions of sealing element 52 and second opening 46 provide complementary regions forming an openable seal between accumulator chamber 60 and second chamber 45. Sealing element 52 may be any composition useful in sealing a valve or passageway between and/or across a pressure gradient.

Sealing element 52 is coupled to valve stem 51 by way of coupling mechanism 53. Preferably coupling mechanism 53 is a screw, bolt or the like that threadedly engages an interior passageway within valve stem 51. As shown in Figure D, sealing element 52 may be further secured to valve stem 51 by way of an O-ring 54, which is securable within an annular groove extending about an exterior side of the sealing element 52. The O-ring is sized to provide constrictive force on sealing element 52 such that it is secured to shaft and/or coupling mechanism 53, but without hindering the engagement of sealing element 52 with second opening 46.

Spring 55 of the valve assembly is adapted to slide over valve stem 51 so as to be secured between diaphragm 50 and sealing element 52. More specifically, the spring is preferably a coil spring with an internal diameter slightly larger than the diameter of valve stem 51.

Referring to Figure D, diameter of spring 55 is slightly larger than opening 41 of the first chamber and has a length closely approximating the distance between annular shoulder 42 and diaphragm 50, when installed as illustrated. Spring 55 provides actuation for the diaphragm valve assembly to move along the longitudinal axis of the blowback assembly 5. More specifically, spring 55 provides actuation to oscillate sealing element 52 into and away from a sealing engagement with second opening 46. Such oscillations are provided by the flexibility of diaphragm 50 and in response to a pilot air supply introduced into the pilot valve chamber.

As shown in Figures A and C, the bottom disk 20, first, second and third cylindrical casing segments 15, 25, 30 and the diaphragm valve assembly 35 are all coupled together by one or more rods 31. Specifically, as shown in Figure B, each of bottom disk 20, second and third cylindrical casing segments 25, 30 and diaphragm 50 contain a plurality of holes 65 spaced about the periphery of each of these parts. These holes are positioned to align along the length of the blowback assembly 5 and are sized to receive a rod 31 with a plurality of threads at each end.

As illustrated in Figure D, rod 31 is sized to pass from the holes 65 in bottom disk 20, through the holes in diaphragm 50, through the hole in second cylindrical casing segment 25, and, ultimately, through the holes in third cylindrical casing segment 30.

A securing mechanism 66, such as a nut, may be coupled to both ends of rod 31 as shown such that the opposing forces generated by each nut tighten the pieces of the blowback assembly 5 and, effectively, seal the interior of the blowback assembly 5 and each of the chambers contained therewithin. Figures A through D illustrate three such rods 31 as being secured therein, however, the invention is not limited to this configuration. A greater number or fewer rods may be used, so long as the seals discussed herein are effective. Finally, the invention is not limited to rod construction and assembly.

The blowback assembly 5 may be coupled to a plate so as to be easily secured to a vacuum source 10. More specifically, plate 70 is preferably metallic and uses at least one U-bolt 75 securing the blowback assembly 5 thereto. As illustrated in Figure B, plate 70 preferably contains a hole 71 passing therethrough which is adapted to align with third opening 47 of second cylindrical casing segment 25 and a corresponding hole in the vacuum source (not illustrated) that is juxtaposed to the filter. Such alignment is further facilitated by an extension member 72. More specifically, extension member 72 aligns third opening 47, hole 71, and the hole in the vacuum source. The extension member 72 is sealingly coupled to both third opening 47 and the vacuum source such that fluid passes therebetween without escaping from either location. Accordingly, when the blowback assembly 5 is secured to plate 70 by U-bolt 75, third opening 47 is in fluid communication with the hole in plate 70 such that air exiting the second cylindrical casing segment 25 passes therethrough and into the vacuum source.

As illustrated in Figures E and F, blowback assembly 5 and plate assembly are preferably secured to vacuum source 10 such that third opening 47 of the second cylindrical casing component 25 is in fluid communication with the interior of the vacuum source 10. Preferably the blowback assembly 5 is positioned relative to the air filter of the vacuum source such that any air flow exiting third opening 47 passes through the filter in a direction opposite to the ordinary flow of air drawn by the vacuum source.

Blowback assembly 5 may be secured to the vacuum source by any suitable method. For example, the plate assembly may be secured to the vacuum source by a plurality of screws or bolts such that the blowback assembly 5 and the vacuum source are in fluid communication.

In operation, the blowback assembly 5 as disclosed in parent application Ser. No. 12/201,562 accumulates pressurized air, release of which is controlled by the solenoid actuated valve (which is conventional and is not illustrated) of the diaphragm valve assembly 35. Blowback assembly 5 is ordinarily in the configuration illustrated in Figure D and is connected to the vacuum source as discussed above and as illustrated in Figures E through G. In this configuration, pressurized air is pumped into the accumulator chamber 60 by hoses coupled to fitting 21 until a desired pressure is reached in accumulator chamber 60.

When the vacuum source is no longer in use, blowback assembly 5 utilizes air pressure within accumulator chamber 60 to clean the air filter of the vacuum source. Specifically, after the vacuum source turns off, a pilot supply of air is briefly and quickly introduced via fitting 34 into the pilot valve chamber within third cylindrical casing segment 30. The air is introduced in sufficient volume and at sufficient pressure to cause elastomeric diaphragm 50 to rapidly flex downwardly (considering the orientation shown in Figure D) against the beveled surface of the annular upper wall 28 with the second cylindrical casing segment 25. This causes sealing element 52 to move downwardly, considering Figure D, snapping away from second opening 46. High pressure air within accumulator chamber 60 then flows from accumulator chamber 60 into second chamber 45 of second cylindrical casing component 25 where the air is directed through third opening 47 and onto the vacuum source. Because axis of third opening 47 is perpendicular to the direction vacuum pulls air through the filter, the pressurized air forced out of third opening 47 blows through the air filter in a direction opposition of normal air flow of air as drawn by the vacuum. Opening 47 is approximately 1 inch in diameter, facilitating the elimination of dust and particles trapped on the filter.

As the burst of air is released from the accumulator chamber into the vacuum source, thereby cleaning the filter, pressure within the pilot valve chamber is almost immediately relieved. This reduces pressure on the diaphragm and on spring 55 Accordingly, force exerted on diaphragm 50 by spring element 55 causes diaphragm 50 to return to its neutral configuration. Such movement by diaphragm 50 away from the upper annular wall 28 of second cylindrical casing segment also causes sealing element 52 to reengage with the beveled walls of second opening 46. Accordingly, the blowback assembly quickly returns to its neutral configuration. Accumulator chamber 60 is then resupplied with pressurized air through fitting 21, so the blowback assembly is ready for the next cycle.

In all of the embodiments of the invention, the relatively large size of the aperture through which the air blast is released, relative to the size of solenoid valve apertures, provides the blast of air in a manner similar to an automobile air bag actuating upon a collision. The relatively large size of the aperture relative to the reservoir provides the explosive blast of air that clears dust from the entire dust filter, not just from one portion of the filter towards which a stream of air is directed, as is the case when a solenoid valve is used.

While much of the description of the invention has focused on supplying resinous material to a gravimetric blender, it is to be understood that the loaders of the invention and the receiver of the invention may be used to load material hoppers, dryer hoppers, silos, or anything else that holds granular material.

The following is claimed:

1. Apparatus providing resin material to resin material processing equipment, comprising:
   a. a housing having a resin material intake, a granular material outlet, the outlet being located for downward, gravity flow of resin material towards the processing equipment, and a suction inlet for drawing vacuum within the housing to convey resin material into the housing under vacuum;
   b. a dust filter connected to the housing and positioned therewithin between the resin intake and the suction inlet so that air from the resin intake cannot reach the suction inlet without passing through the dust filter;
   c. apparatus connected to the housing for delivering an air blast to the housing interior for air flow through the dust filter in a direction opposite the direction air is drawn through the filter towards the suction inlet, comprising:
      i. a shell having an first aperture communicating with the housing interior and a second aperture for introduction of pressurized air into the shell;
      ii. a closure member movable slideably within the shell to close the first aperture at one extremity of member travel;

iii. a seal between the closure member and the shell interior, permitting air flow between the shell interior and the closure member towards the first aperture, but blocking air flow between the shell interior and the closure member towards the second aperture.

2. Apparatus of claim 1 further comprising a reservoir in fluid communication with the shell interior via a third aperture in the shell.

3. Apparatus of claim 1 wherein the closure member has a rounded portion for closing the first aperture.

4. Apparatus of claim 3 wherein the closure member is round.

5. Apparatus of claim 3 wherein the closure member has a rounded end for closing the first aperture, and a cylindrical body.

6. Apparatus of claim 1 wherein the closure member is plastic.

7. Apparatus of claim 6 wherein the closure member is acetyl copolymer.

8. A tiltable vacuum loader for providing granular resin material to resin material processing equipment, comprising:
    a. loader housing having a granular resin material intake and a granular resin material outlet, the outlet being located for downward gravity flow of granular material from the loader towards the processing equipment;
    b. a vacuum motor connected to the loader housing for drawing vacuum carried granular resin material into the housing;
    c. a dust filter within the loader housing, positioned between the granular resin material intake and a suction intake of the vacuum motor;
    d. apparatus for delivering a blast of air to the interior of the housing, for air flow through the dust filter in a direction opposite from the direction air is drawn through the filter by the vacuum motor, comprising:
        i. an air blast generator shell having a first aperture communicating with the loader housing interior between the dust filter and the vacuum motor suction intake;
        ii. a closure member within the shell and being movable therewithin, to close the first aperture responsively to introduction of pressurized air to the shell interior, being movable to open the first aperture when air pressure in the shell is relieved;
    e. a seal between the closure member and the interior of the shell, permitting air flow between the shell interior and the closure member towards the first aperture, but blocking air flow between the shell interior and the closure member away from the first aperture;
    f. a pivotally mounted dump flap at the loader housing outlet;
    g. a sensor connected to the loader housing for detecting when the dump flap is in pivotal balance with a counterweight;
    h. a mounting plate having a pair of integral apertured lugs extending upwardly from the plate, the apertures being aligned to receive a common shaft therethrough;
    i. a pair of parallel apertured webs extending outwardly from the housing proximate the granular material outlet, the web apertures being aligned and positioned to receive the common shaft therein when the loader is positioned on the mounting plate;
    j. a shaft extending through the lug apertures and the web apertures;
    k. a lateral web extending horizontally from the housing at the level of the webs but angularly spaced therefrom;
    l. a pivoting latch for retaining the loader in an upright operating position and supporting the loader when placed in a tilted orientation for cleaning or maintenance 9. Apparatus for delivering an air blast, comprising;
    a. a shell having an aperture therein via which the air blast is delivered;
    b. a closure member residing within the shell and being movable, responsively to air entering the shell, between a positions at which the closure member closes the aperture and at which the first closure member is spaced from the aperture;
    c. a seal between the closure member and the shell, for permitting air flow between the shell interior and the closure member towards the aperture, but blocking air flow between the shell interior and the closure member away from the aperture.

10. Apparatus of claim 9 further comprising a reservoir in fluid communication with the interior of the shell, for receiving, storing and returning pressurized air that is supplied to the shell interior.

11. Apparatus of claim 10 wherein the reservoir is annular and the shell is a part of the annulus.

12. Apparatus of claim 9 wherein the aperture is round and the closure member has a rounded portion for closing the aperture.

13. Apparatus of claim 12 wherein the closure member is round.

14. Apparatus of claim 12 wherein the closure member has a rounded end for closing the first aperture, and a cylindrical body.

15. Apparatus of claim 9 wherein the closure member is plastic.

16. Apparatus of claim 15 wherein the closure member is acetyl copolymer.

17. A method for delivering an air blast, comprising;
    a. delivering pressurized air against a movable closure member in an enclosed housing to move the closure member closingly against an aperture in the housing while permitting the pressurized air to fill the housing interior; and
    b. relieving pressure of air against the closure member thereby permitting the closure member to move away from the aperture, resulting in escape of pressurized air from the housing via the aperture.

18. The method of claim 17 wherein the aperture is round.

19. The method of claim 18 wherein the closure member is round.

20. The method of claim 18 wherein the closure member has a rounded end for closing the first aperture, and a cylindrical body.

21. The method of claim 17 wherein the closure member is plastic.

22. The method of claim 21 wherein the closure member is acetyl copolymer.

23. A tiltable vacuum loader for providing granular material to granular material processing equipment, comprising:
    a. a housing having a granular material intake and a granular material outlet facilitating downward gravity flow of granular material out of the loader towards the processing equipment;
    b. a loader mounting plate; and
    c. a latch connected to the loader and the plate, and being movable relative thereto between a position at which the latch maintains the loader in an upright operating position, and a position at which the latch supports the loader at a tilted orientation for cleaning or maintenance.

24. The loader of claim 23 wherein the latch is planar.

25. The loader of claim 24 wherein the latch is triangular.

26. The loader of claim 25 wherein the latch configured as a 30°-60°-90° right triangle.

27. The loader of claim 26 wherein the 30 and 60 degree vertices of the triangle are notched respectively to retain the loader from tilting and to support the loader when tilted.

28. The loader of claim 26 wherein the pivotal connection of the latch to the mounting plate is proximate the right angle of the triangle.

29. A method for feeding resin material, comprising:
  a. halting delivery of a previous batch of resinous material into a housing by halting draw of conveying vacuum;
  b. allowing a housing dump flap to open, permitting downward flow of resinous material out of the housing through a discharge chute;
  c. providing a blowback air blast to clear a filter within the housing, located between a resin material delivery inlet and a vacuum suction intake, of dust;
  d. permitting the dump flap to freely swing until reaching an equilibrium position and actuating a vacuum motor;
  e. drawing vacuum in the housing, thereby drawing the dump flap into position closing the discharge chute;
  f. after vacuum drawing commences, providing a blowback air blast to open the dump flap and jar loose any resinous material sticking thereto;
  g. continuing drawing vacuum in the housing to convey resinous material thereinto with the drawn vacuum maintaining the dump flap against the discharge chute until the housing is sufficiently filled with resinous material.

30. Apparatus of claim 1 in which the volume of the shell interior is between about thirty percent (30%) and about fifty percent (50%) of the volume of the housing between the filter and the suction inlet.

31. Apparatus of claim 2 in which the combined volume of the shell interior and the reservoir is between about thirty percent (30%) and about fifty percent (50%) of the volume of the housing between the filter and the suction inlet.

32. The loader of claim 8 wherein the latch is weighted to pivotally return to a web-retaining position when released by an operator.

33. A method for feeding resin material, comprising:
  a. allowing a flap to swing, permitting downward flow of resinous material out of the housing;
  b. providing a blowback air blast to clear dust from a filter within the housing between a delivery inlet and a vacuum suction intake;
  c. permitting the flap to move to actuate a vacuum motor;
  d. drawing vacuum in the housing, thereby drawing the flap into position closing the housing;
  e. providing a blowback air blast to open the flap and loosen any resinous material sticking thereto;
  f. continuing drawing vacuum in the housing to convey resinous material thereinto while maintaining the flap closing the housing until the housing is sufficiently filled with resinous material.

* * * * *

UNITED STATES PATENT AND TRADEMARK OFFICE
CERTIFICATE OF CORRECTION

| | |
|---|---|
| PATENT NO. | : 8,753,432 B2 |
| APPLICATION NO. | : 13/310978 |
| DATED | : June 17, 2014 |
| INVENTOR(S) | : Stephen B. Maguire |

It is certified that error appears in the above-identified patent and that said Letters Patent is hereby corrected as shown below:

In the specification:

At column 8, line number 24, please correct "application Ser. No. 12/201,562" to --U.S. Pat. No. 8,070,844 B2--.

At column 8, line number 40, please correct "application Ser. No. 12/201,562" to --U.S. Pat. No. 8,070,844 B2--.

At column 8, line number 60, please correct "application Ser. No. 12/201,562" to --U.S. Pat. No. 8,070,844 B2--.

At column 9, line number 6, please correct "application Ser. No. 12/201,562" to --U.S. Pat. No. 8,070,844 B2--.

At column 10, line number 16, please correct "application Ser. No. 12/201,562" to --U.S. Pat. No. 8,070,844 B2--.

At column 18, line number 13, please correct "application Ser. No. 12/201,562" to --U.S. Pat. No. 8,070,844 B2--.

At column 20, line number 48, please correct "Figures A through G" to --Figures 17 through 23--.

At column 20, line number 49, please correct "application Ser. No. 12/201,562" to --U.S. Pat. No. 8,070,844 B2--.

At column 20, line numbers 51 and 52, please correct "Figures A through D" to --Figures 17 through 20--.

Figure 18:
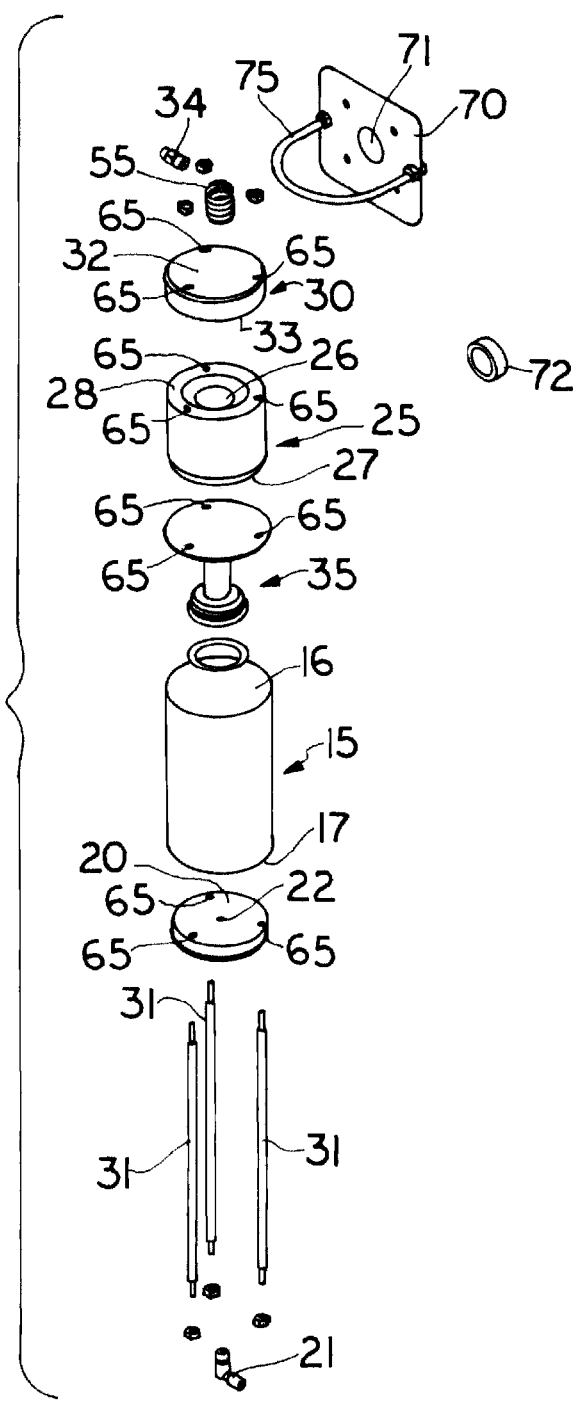
FIG. 18 is an exploded isometric view of the blowback assembly illustrated in FIG. 17.

At column 20, line number 58, please correct "Figure B" to --Figure 18--.

Signed and Sealed this
Twenty-second Day of March, 2016

Michelle K. Lee
*Director of the United States Patent and Trademark Office*

In the specification:

At column 21, line number 17, please correct "Figures A through G" to --Figures 17 through 23--.

Figure 20:
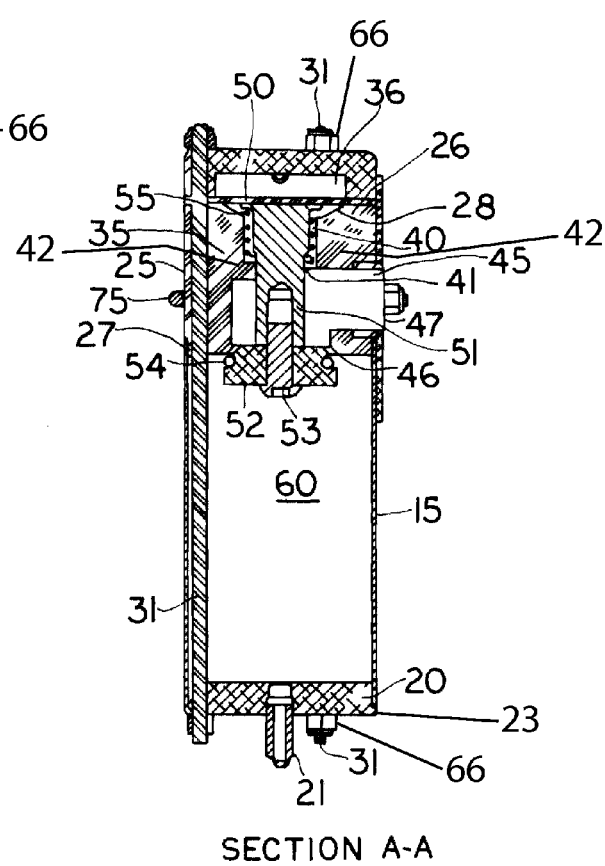
FIG. 20 is a vertical section taken at arrows A-A in FIG. 19.

At column 21, line number 29, please correct "Figures B and D" to --Figures 18 and 20--.

At column 21, line number 47, please correct "Figure B" to --Figure 18--.

Figure 17:
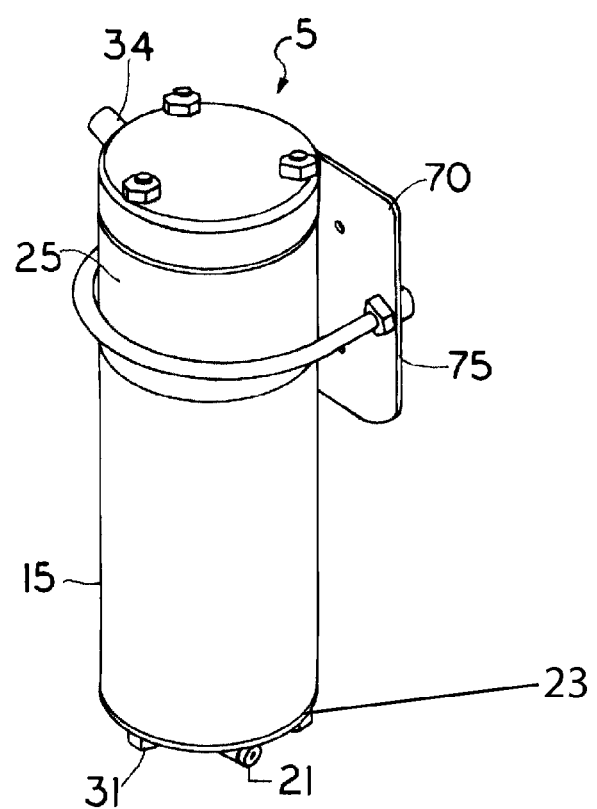
FIG. 17 is an isometric exterior view of the blowback assembly disclosed in parent application Ser. No. 12/201,562.
Figure 19:
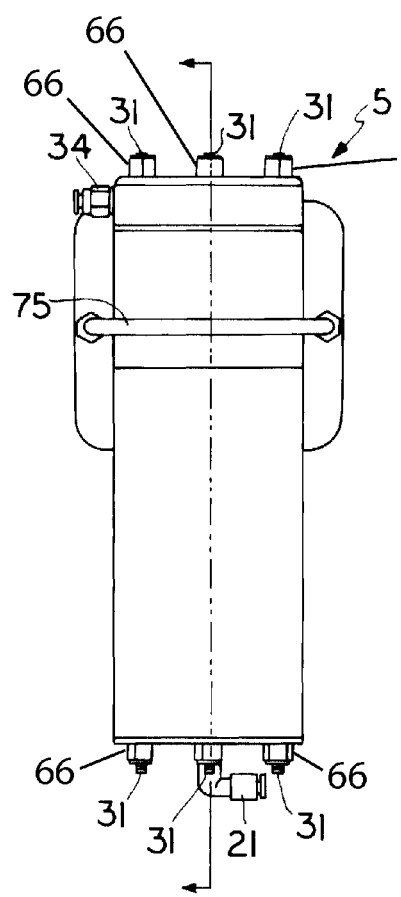
FIG. 19 is a front elevation of the blowback assembly illustrated in FIGS. 17 and 18.

At column 22, line number 11, please correct "Figures A and C" to --Figures 17 and 19--.

At column 22, line number 41, please correct "Figure D" to --Figure 20--.

At column 22, line number 47, please correct "Figure D" to --Figure 20--.

At column 22, line number 59, please correct "Figure D" to --Figure 20--.

At column 23, line number 4, please correct "Figure D" to --Figure 20--.

At column 23, line number 12, please correct "Figure D" to --Figure 20--.

Figure 21:
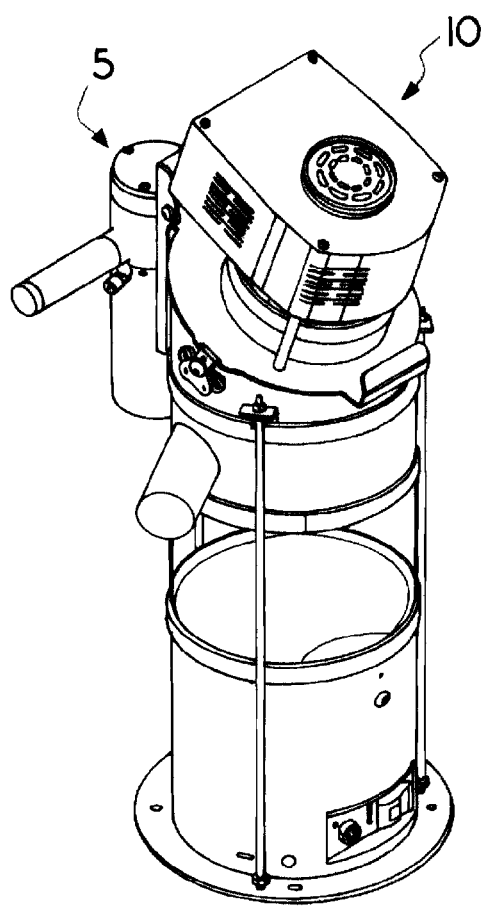
FIG. 21 is an isometric view of a vacuum loader equipped with a blowback assembly as illustrated in FIGS. 17 through 20.
Figure 22:
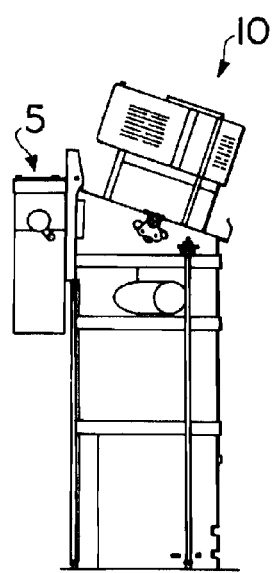
FIG. 22 is a front elevation of the vacuum loader—blowback assembly illustrated in FIG. 21.

At column 23, line number 38, please correct "Figures E and F" to --Figures 21 and 22--.

At column 23, line numbers 63 and 64, please correct "application Ser. No. 12/201,562" to --U.S. Pat. No. 8,070,844 B2--.

At column 24, line number 34, please correct "Figure D" to --Figure 20--.

At column 24, line number 47, please correct "Figure D" to --Figure 20--.

At column 24, line number 58, please correct "Figures A and C" to --Figures 17 and 19--.

At column 24, line number 61, please correct "Figure B" to --Figure 18--.

At column 25, line number 1, please correct "Figure D" to --Figure 20--.

At column 25, line number 11, please correct "Figures A through D" to --Figures 17 through 20--.

At column 25, line number 20, please correct "Figure B" to --Figure 18--.

At column 25, line number 35, please correct "Figures E and F" to --Figures 21 and 22--.

At column 25, line number 50, please correct "application Ser. No. 12/201,562" to --U.S. Pat. No. 8,070,844 B2--.

CERTIFICATE OF CORRECTION (continued)
U.S. Pat. No. 8,753,432 B2

In the specification:

At column 25, line number 54, please correct "Figure D" to --Figure 20--.

Figure 23:
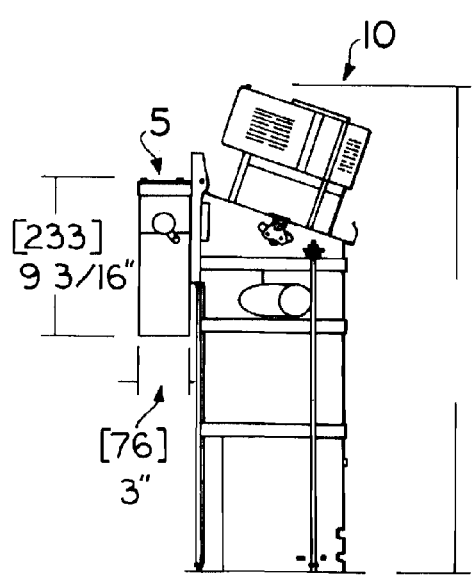
FIG. 23 is a view identical to FIG. 22, showing some dimensions of the vacuum loader—blow-back assembly illustrated in FIGS. 17 through 22.

At column 25, line number 56, please correct "Figures E through G" to --Figures 21 through 23--.

At column 26, line number 1, please correct "Figure D" to --Figure 20--.

At column 26, line number 4, please correct "Figure D" to --Figure 20--.

In the claims:

At column 28, line number 3, please insert --.-- after the word "maintenance.".